United States Patent
Friedsam et al.

(10) Patent No.: US 6,672,198 B2
(45) Date of Patent: Jan. 6, 2004

(54) VACUUM BRAKE BOOSTER WITH MECHANICAL EMERGENCY BRAKING AID

(75) Inventors: Ludwig Friedsam, Oberdürenbach (DE); Heinrich Plewnia, Niederhofen (DE); Gerd Puscher, Anderach (DE); Peter Schlüter, Kammerforst (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/427,088

(22) Filed: Apr. 30, 2003

(65) Prior Publication Data

US 2003/0188632 A1 Oct. 9, 2003

Related U.S. Application Data

(63) Continuation of application No. PCT/EP01/04523, filed on Apr. 20, 2001.

(30) Foreign Application Priority Data

Nov. 2, 2000 (DE) .......................... 100 54 252

(51) Int. Cl.[7] ................................. F15B 9/10
(52) U.S. Cl. ........................ 91/367; 91/369.2
(58) Field of Search .............. 91/367, 369.1, 91/369.2, 369.3, 376 R

(56) References Cited

U.S. PATENT DOCUMENTS

| | | | |
|---|---|---|---|
| 6,505,539 B2 | 1/2003 | Schlüter | 91/367 |
| 6,520,063 B2 | 2/2003 | Schlüter | 91/367 |

FOREIGN PATENT DOCUMENTS

| | | | | |
|---|---|---|---|---|
| DE | 200 08 262 | | 10/2000 | |
| DE | 199 38 040 | | 1/2001 | |
| DE | 19960576 C1 | * | 5/2001 | .......... B60T/13/57 |
| DE | 10002055 A1 | * | 8/2001 | .......... B60T/13/57 |
| DE | 10019425 A1 | * | 10/2001 | .......... B60T/13/57 |
| JP | 09175373 A | * | 7/1997 | .......... B60T/13/57 |
| JP | 9-175373 | | 8/1997 | |
| WO | 00/07862 | | 2/2000 | |

* cited by examiner

Primary Examiner—Edward K. Look
Assistant Examiner—Thomas E. Lazo
(74) Attorney, Agent, or Firm—MacMillan, Sobanski & Todd, LLC

(57) ABSTRACT

A vacuum brake booster (10) is described, having a vacuum chamber (16) and a working chamber (18) separated from one another by a movable wall (14), and a control valve (20), which comprises a housing (12) coupled workingly to the movable wall (14) and which to achieve a pressure difference at the movable wall (14) is capable of controlling the supply of atmospheric pressure or above-atmospheric pressure to the working chamber (18) in dependence upon the displacement of an actuating piston (28). The vacuum brake booster (10) has an emergency braking aid comprising a permanent magnet (38) and an armature (36), which cooperates with the permanent magnet (38) and is resiliently biased counter to actuating direction and during an emergency braking operation is drawn into abutment with the permanent magnet (38), with the result that the control valve (20) is held open for the supply of atmospheric pressure to the working chamber (18). The vacuum brake booster (10) comprises a coupling device (90) for detachably coupling the armature (36) to the actuating piston (28).

23 Claims, 23 Drawing Sheets

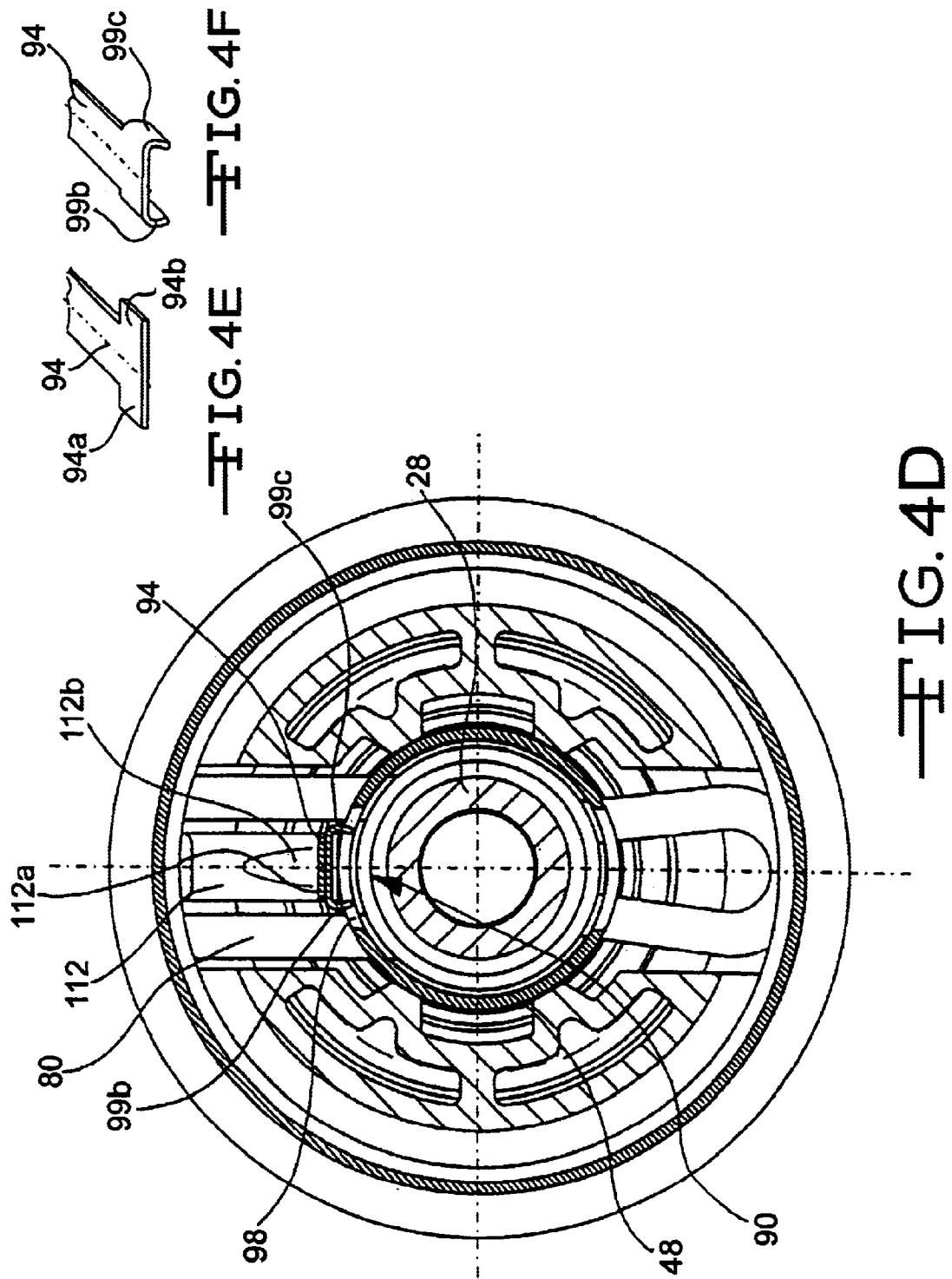

VACUUM BRAKE BOOSTER WITH MECHANICAL EMERGENCY BRAKING AID

CROSS REFERENCE TO RELATED APPLICATIONS

This application is a continuation of International Application No. PCT/EP01/04523 filed Apr. 20, 2001, which claimed priority to German Patent Application No. 100 54 252.2 filed Nov. 2, 2000, the disclosures of which are incorporated herein by reference.

BACKGROUND OF THE INVENTION

The invention relates to a vacuum brake booster having a vacuum chamber and a working chamber separated from one another by a movable wall, a control valve, which comprises a housing coupled workingly to the movable wall and which to achieve a pressure difference at the movable wall is capable of controlling the supply of atmospheric pressure or above-atmospheric pressure to the working chamber in dependence upon the displacement of an actuating piston, and having an emergency braking aid comprising a permanent magnet and an armature, which cooperates with the permanent magnet and is resiliently biased counter to actuating direction and during an emergency braking operation is drawn into abutment with the permanent magnet, with the result that the control valve is held open for the supply of atmospheric pressure to the working chamber.

Vacuum brake boosters have been known for some time and millions are in use for boosting the actuating forces of a vehicle hydraulic brake system and therefore keeping the actuating forces at a level which is comfortable for the driver of a vehicle. Likewise known are so-called emergency braking aids, which are frequently also referred to as "brake assists". These are devices which, given substantially the same actuating force, in an emergency braking situation provide a driver with increased braking power.

Emergency braking aids may be divided into electromagnetically actuated and mechanically actuated systems. For reasons of cost, the use of a mechanical system is frequently desirable.

A vacuum brake booster having such a mechanical emergency braking aid is known, for example, from WO 00/07862, and corresponding U.S. Pat. No. 6,505,539 B2 which is incorporated by reference herein. Said vacuum brake booster has a vacuum chamber and a working chamber separated from one another in a pressure-tight manner by a movable wall. A control valve, which has a housing coupled workingly to the movable wall, comprises an atmospheric valve seat, which to achieve a pressure difference at the movable wall is capable of controlling the supply of atmospheric pressure to the working chamber in dependence upon the displacement of an actuating piston, coupled to an input element of the brake booster.

For improved boosting of the braking force during emergency braking operations, a mechanical emergency braking aid is disposed in the housing of the control valve. The emergency braking aid comprises an armature, which cooperates with a permanent magnet and is rigidly connectable in actuating direction to the actuating piston by means of a stop formed on the actuating piston. The armature is resiliently biased counter to the actuating direction of the brake booster towards the stop formed on the actuating piston and, in the initial position of the control valve, is held at a first distance from the permanent magnet. In the course of an approach towards the permanent magnet the armature, when it is less than a previously defined second distance, which is smaller than the first distance, from the permanent magnet is drawn by the permanent magnet counter to the resilient bias force acting upon the armature and with simultaneous cancellation of its, in actuating direction, rigid coupling to the actuating piston into abutment with the permanent magnet. Consequently, the atmospheric valve, whose valve seat is formed integrally with a sleeve-shaped extension coupled rigidly to the armature, is held open to the maximum extent. The maximum possible pressure difference then builds up, with the result that the maximum possible boosting force of the brake booster is achieved.

After an emergency braking operation the armature has again to be detached from the permanent magnet. This is effected by means of a bar, which is rigidly connected to the actuating piston, extends at right angles to a longitudinal axis of the actuating piston and projects through a recess of the sleeve-shaped extension of the armature, which extension extends counter to actuating direction. During a return stroke of the input element of the brake booster, the actuating piston as well is displaced counter to actuating direction. The bar coupled to the actuating piston in said case comes into abutment with an end of the recess of the sleeve-shaped extension facing the vacuum chamber, so that the forces displacing the actuating piston counter to actuating direction are introduced into the sleeve-shaped extension coupled to the armature. As said forces exceed the force required to detach the armature from the permanent magnet, the displacement of the actuating piston counter to actuating direction, which is associated with a reduction of the actuating force summoned up by the driver, leads finally to a detaching of the armature from the permanent magnet.

Because of the displacement of the actuating piston counter to actuating direction which is necessary to detach the armature from the permanent magnet, the stop formed for the armature on the actuating piston has also moved away from the armature by the displacement distance of the actuating piston. After the detachment of the armature from the permanent magnet, the armature is consequently accelerated along the displacement path of the actuating piston by the bias force acting counter to the actuating direction of the brake booster upon the armature. The armature therefore impacts at high speed against the stop formed on the actuating piston. Said impact of the armature on the stop provided for the armature produces a clearly perceptible, obtrusive cutout noise.

Operating positions of the brake booster are additionally possible, in which, prior to the impact of the armature on the stop formed on the actuating piston, the valve seat formed on the free end of the sleeve-shaped extension of the armature impacts on the associated valve sealing element of the control valve and pulls the latter abruptly open. As a result, the connection between the working chamber and the vacuum chamber is opened and the braking force boost summoned up by the brake booster is abruptly reduced, which manifests itself to the driver in the form of an unpleasant force impact on the brake pedal.

SUMMARY OF THE INVENTION

The object of the invention is to provide a vacuum brake booster with mechanical emergency braking aid, which presents improved operating behaviour.

Proceeding from a vacuum brake booster of the type initially described, said object is achieved according to the invention by provision of a coupling device, which allows detachable coupling of the armature to the actuating piston.

By means of the coupling device according to the invention the movement of the armature counter to actuating direction relative to the actuating piston may be influenced in order to prevent an uncontrolled relative movement between armature and actuating piston as a result of detaching of the armature from the permanent magnet. The coupling device makes it possible, after the detachment of the armature from the permanent magnet, to prevent an acceleration of the armature counter to actuating direction or at least reduce such an acceleration in such a way that the cutout problems observed in prior art vacuum brake boosters no longer arise in vacuum brake boosters according to the invention.

Coupling is preferably effected as a consequence of a return stroke movement of the actuating piston, i.e. the coupling device may be activated by a return stroke movement. Coupling may be effected before or after the armature was pulled off the permanent magnet.

The coupling of armature and permanent magnet may be effected e.g. by means of frictional, non-positive or positive engagement. Preferably, the coupling device is designed in such a way that a coupling is effected only after a specific return stroke of the input element of the vacuum brake booster but still before detachment of the armature from the permanent magnet. Armature and actuating piston may be coupled both directly and indirectly to one another. An indirect coupling of actuating piston and armature is possible, for example, by coupling the actuating piston to a further component of an armature subassembly also comprising the armature. Thus, for example, the actuating piston may be coupled to a sleeve-shaped extension of the armature, which extension extends counter to actuating direction.

According to a first embodiment of the invention, the coupling device takes the form of a detent device, which allows a coupling of armature and actuating piston by means of a detent connection. The detent connection preferably comprises a first detent element and a complementary second detent element, which cooperate in order to couple armature and actuating piston. The detent connection is preferably formed and released by moving the first detent element in radial direction relative to a longitudinal axis of the vacuum brake booster. The first detent element is in said case advantageously biased in radial direction, i.e. either radially inwards or radially outwards.

According to a first variant of the first embodiment, the first detent element takes the form of a snap-action hook or snap ring, which cooperates with a second detent element e.g. in the form of an indentation or opening. The snap-action hook is advantageously disposed on the end of a substantially axially extending swivelling arm so that the snap-action hook is movable by means of a swivelling motion in radial direction. The snap-action hook may be integral with the swivelling arm. In this manner it is possible, for example, to manufacture the snap-action hook by bevelling the swivelling arm in certain areas.

The swivelling arm may be rigidly coupled to a further arm which allows deflection of the swivelling arm. Consequently, the further arm allows an actuation of the swivelling arm since a deflection of the further arm is transmitted to the swivelling arm. The deflection of the further arm is preferably the result of a cooperation of the further arm with a stop movable relative to the further arm. The stop may be formed in a housing of the vacuum pressure brake booster, for example.

The swivelling arm and the further arm may be manufactured separately and connected by welding, for example, in order to simplify manufacture of the coupling device and to avoid complex bending processes. It is advantageous in such a coupling device to attach the swivelling arm rather than the further arm in pivoting manner to the actuating piston. Such a construction allows an improved force introduction into the actuating piston since the retaining forces summoned up by the swivelling arm in the coupled position can directly be transmitted to the actuating piston.

The snap-action hook, i.e. the first detent element, may have an inclined surface cooperating with a border of the corresponding opening, i.e. the complementary detent element. In the extreme case, the snap-action hook may be embodied by said inclined surface. Measurement tolerances can be compensated by the inclined surface since it allows an always play-free cooperation of the snap-action hook with the opening provided for the snap-action hook.

According to a second variant of the first embodiment, the first detent element is spherical or annular in shape and cooperates with a second detent element in the form of a bevel in such a way that, depending on the axial position of the first detent element relative to the bevel, the armature is coupled to the actuating piston or the coupling is released.

In the two previously described variants of the first embodiment, the first detent element and the second detent element may be provided in each case both in the region of the armature and in the region of the actuating piston. Preferably, however, the first detent element is disposed in the region of the actuating piston and the second detent element is formed in a sleeve-shaped extension of the armature.

According to a second embodiment of the invention, the coupling device takes the form of a clamping device. In the second embodiment, the coupling of the armature to the actuating piston is consequently effected by a clamping joint.

The clamping device may comprise a clamping element, which is capable of generating a clamping force in radial direction, i.e. in relation to a longitudinal axis of the vacuum brake booster radially inwards or radially outwards. Preferably, the clamping element has, in relation to axial relative movements between armature and actuating piston in and counter to actuating direction, asymmetrical clamping properties. In other words, depending on the direction of the axial relative movement between armature and actuating piston, a clamping force of differing intensity is generated by the clamping element. The clamping element is advantageously designed in such a way that it generates a clamping force at least when the armature moves counter to actuating direction relative to the actuating piston.

According to a first variant of the second embodiment of the invention, the asymmetrical clamping properties are realized by means of a bevel, which cooperates with the clamping element. Thus, it is possible to design the clamping element in such a way that, as a result of a relative movement between armature and actuating piston in axial direction, it runs off along the bevel and therefore generates a radially effective clamping force. The clamping element advantageously takes the form of a rolling body, e.g. a ball or ring. The bevel may be formed both in the region of the armature, e.g. radially at the inside of a sleeve-shaped extension of the armature, and in the region of the actuating piston.

According to a second variant of the second embodiment of the invention, for realizing asymmetrical clamping properties a clamping arm is provided, which extends obliquely relative to the longitudinal axis of the brake booster and is preferably biased in radial direction. The clamping arm is preferably rigidly connected either to the actuating piston or to the armature or a component of the armature subassembly and comprises an end portion, which under initial tension contacts either the armature and/or the armature subassembly or the actuating piston. The asymmetrical clamping properties of the clamping arm are attributable to its oblique position, i.e. the introduction of force at a specific angle e.g. from the armature into the actuating piston or vice versa.

Both in the first and in the second embodiment of the invention an axially movable opening sleeve may be provided, which allows a releasing of the coupling between armature and actuating piston. The opening sleeve is preferably disposed radially at the inside relative to a sleeve-shaped extension of the armature extending counter to actuating direction and is freely movable in axial direction relative to the sleeve-shaped extension. The releasing of a detent coupling between armature and actuating piston may be effected, for example, in that the opening sleeve cooperates with at least one of two complementary detent elements in such a way that the detent connection is cancelled. A clamping joint may be released by moving the opening sleeve in such a way in axial direction relative to a biased clamping arm that a biased end portion of the clamping arm is brought into abutment with the freely movable opening sleeve.

According to a third embodiment of the invention, the coupling device takes the form of a supporting device, which for coupling the armature to the actuating piston allows a supporting of the armature counter to actuating direction against the actuating piston. The supporting device preferably comprises a swivelling supporting element, which for coupling armature and actuating piston is swivelled into a supporting position.

Independently of the concrete construction of the coupling device, at least one stop may be formed on the actuating piston, which stop is disposed in actuating direction upstream of the armature and cooperates counter to actuating direction with the armature. The detaching of the armature from the permanent magnet is then effected no longer, as in prior art, by means of a bar but by means of the stop formed on the actuating piston. The bar is therefore relieved of its function with regard to detaching of the armature from the permanent magnet, thereby reducing the constructional requirements of the bar. The bar may therefore perform additional functions or, in extreme cases, even be dispensed with entirely, without impairing the process of detaching the armature from the permanent magnet.

The stop formed on the actuating piston preferably cooperates directly with the armature counter to actuating direction. Thus, the stop may cooperate e.g. with an end face of the armature facing the vacuum chamber of the brake booster. The end face of the armature cooperating with the stop is preferably not identical with the end face of the armature which comes into abutment with the permanent magnet. The end face of the armature cooperating with the stop may be disposed, for example, offset axially in or counter to actuating direction relative to the end face of the armature cooperating with the permanent magnet.

The vacuum brake booster advantageously comprises an actuating piston, on which on the one hand the previously described stop for the armature is formed and which on the other hand is additionally coupled to a bar, which extends at right angles to the longitudinal axis of the actuating piston. The bar may perform different functions. Thus, it is conceivable to limit the mobility of the actuating piston in axial direction by means of the bar. To said end, the bar may cooperate with a stop for the bar which is formed e.g. on the housing of the brake booster. The mobility of the actuating piston is advantageously limited at least counter to actuating direction by the interplay between the bar coupled to the actuating piston and the stop provided for the bar.

BRIEF DESCRIPTION OF THE DRAWINGS

FIG. 4d a cross-section through the control valve of the vacuum brake booster of the invention according to FIG. 4c;

FIGS. 4e and 4f the manufacture of the snap-action hook used in the vacuum brake booster of the invention according to FIG. 4c and 4d;

DETAILED DESCRIPTION OF THE INVENTION

Figure 1A:
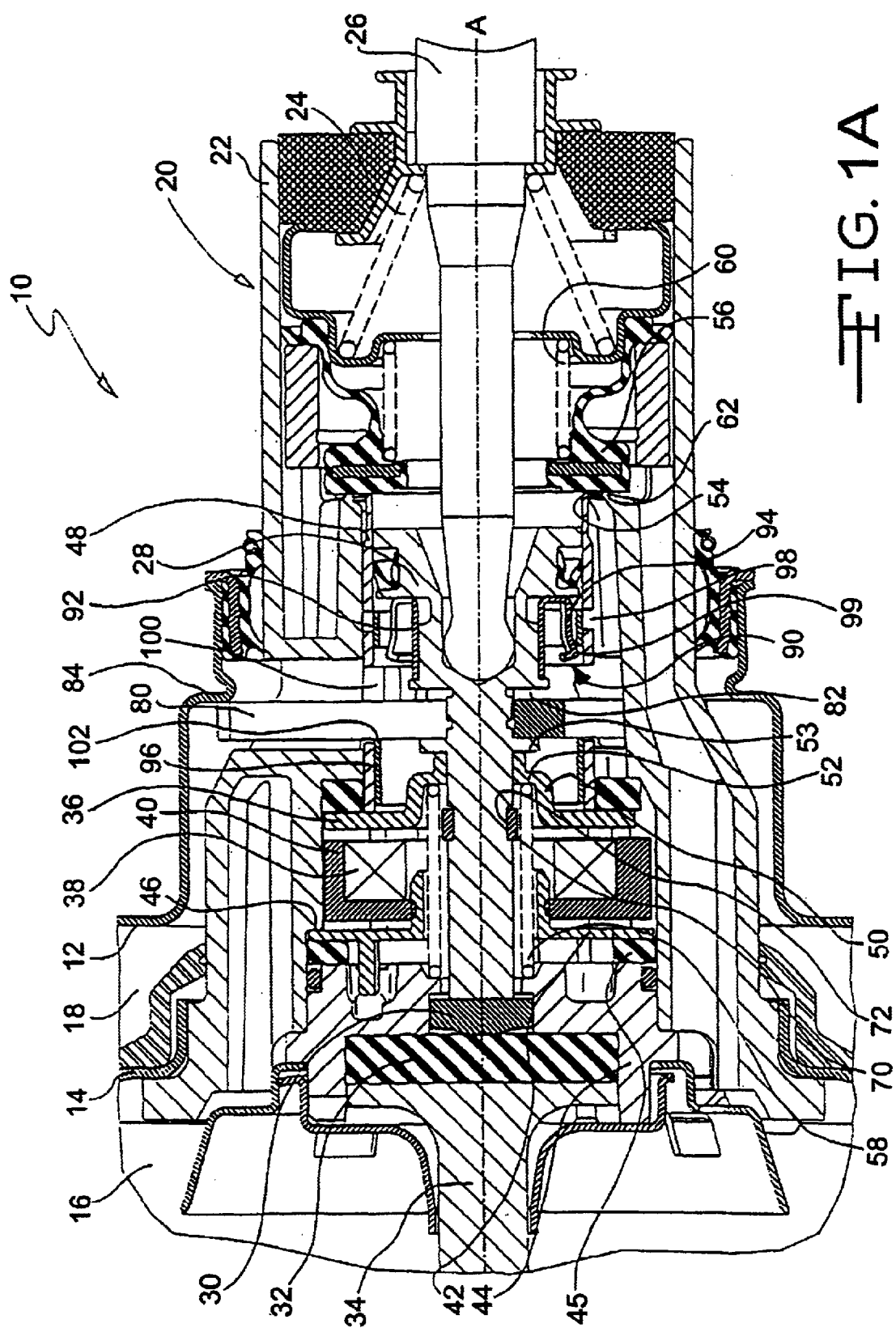
FIGS. 1a–1d longitudinal sections through the control valve of a first embodiment of a vacuum brake booster according to the invention.

FIG. 1a shows a first embodiment of a vacuum brake booster 10 according to the invention having a housing 12, in which a movable wall 14 separates a vacuum chamber 16 in a pressure-tight manner from a working chamber 18.

During operation of the vacuum brake booster 10 the vacuum chamber 16 is constantly in communication with a vacuum source, e.g. with the intake tract of an internal combustion engine or with a vacuum pump. A control valve 20 having a housing 22 may selectively connect the working chamber 18 to the vacuum chamber 16, in order to evacuate the working chamber 18, or connect the evacuated working chamber 18 to the ambient atmosphere, i.e. the ambient pressure, or to above-atmospheric pressure in order to generate a pressure difference at the movable wall 14. The movable wall 14 is workingly coupled to the control valve housing 22.

The brake booster 10 is actuated by means of a rod-shaped input element 26, which is biased into its initial position by a spring 24, projects along an axis A into the control valve housing 22 and is fastened by its one, spherically designed end in an actuating piston 28 by means of fastening means, which are not shown.

The end of the actuating piston 28 remote from the spherically designed end of the input element 26 is in contact with a sensing disk 30, which transmits an actuating force, which is introduced via the input element 26 into the brake booster 10, via a reaction disk 32 made of elastomer material to a reaction piston 34 of a master cylinder (not shown here) of a vehicle hydraulic brake system, which master cylinder is disposed functionally downstream of the brake booster 10.

The actuating piston 28 penetrates an annular armature 36, which is disposed concentrically with the actuating piston 28, and an annular permanent magnet 38, which is likewise disposed concentrically with the actuating piston 28 and is accommodated in a pot-shaped component 40. The permanent magnet 38 and the pot-shaped component 40 are guided so as to be movable in axial direction inside the control valve housing 22. To said end, a screw connection is provided between the pot-shaped component 40 and a fettering sleeve 42, which projects into the interior of the pot-shaped component 40. The fettering sleeve 42 is pressed by an insert 44, which closes off an end of the control valve housing 22 facing the vacuum chamber 16, counter to the actuating direction of the vacuum brake booster 10 towards a stop 46 formed in the control valve housing 22, wherein an elastic element 45 made of an elastomeric material is additionally disposed between the insert 44 and the fettering sleeve 42.

The vacuum brake booster 10 illustrated in FIG. 1a comprises an armature subassembly, which is composed of the annular armature 36 and a sleeve-shaped extension 48, which is rigidly coupled to the armature 36 and extends counter to actuating direction. As may be seen from FIG. 1a, the annular armature 36 has, radially at the inside, a neck 50 extending counter to actuating direction. At its end facing the input element 26 the neck 50 runs into a radially inwardly extending annular collar 52, of which the end face facing the vacuum chamber 16 cooperates with a restoring spring 58. The biased restoring spring 58 is supported by its end facing the vacuum chamber 16 against the insert 44 of the control valve 20 and by its end facing the input element 26 against the annular collar 52 of the armature 36. The armature 36 is biased by the restoring spring 58 counter to the actuating direction of the vacuum brake booster 10 towards a stop 53, which is formed on the actuating piston 28 and cooperates in actuating direction with the armature 36.

In actuating direction downstream of the stop 53 for the armature 36 a further stop 70 is formed on the actuating piston 28 and cooperates counter to actuating direction with the armature 36. Said further stop takes the form of a ring 70, which is disposed immovably in axial direction inside a circumferential receiving groove 72 formed in the radially outer side of the actuating piston 28.

A bar 80 extending at right angles to the longitudinal axis A of the vacuum brake booster 10 is guided in an axially displaceable manner inside a further receiving groove 82 formed in the radially outer side of the actuating piston 28. The mobility of the bar 80 relative to the actuating piston 28 is limited in and counter to actuating direction by the two end faces of the receiving groove 82 facing the bar 80. The bar 80 extends in radial direction through an opening of the sleeve-shaped extension 48.

In the initial position of the vacuum brake booster 10 shown in FIG. 1a, the bar 80 is biased counter to the actuating direction of the vacuum brake booster 10 towards a stop 84 formed on the control valve housing 12. The bias is generated by the restoring springs 58 and 24.

The vacuum brake booster shown in FIG. 1a further comprises a coupling device 90 in the form of a detent device, which allows the armature 36 to be coupled counter to the actuating direction of the vacuum brake booster 10 to the actuating piston 28. The coupling device 90 comprises a sleeve 92, which is disposed radially outside on the actuating piston 28 and rigidly coupled to the actuating piston 28 and which comprises a plurality of radially outwardly projecting and radially outwardly biased swivelling arms 94, as well as an opening sleeve 96 and a plurality of openings 98 provided in the sleeve-shaped extension 48. The outer ends of the swivelling arms 94 in the form of snap-action hooks 99 act as first detent elements, which to form a detent connection cooperate with second detent elements in the form of the openings 98 formed in the sleeve-shaped extension 48.

The opening sleeve 96 is disposed radially at the inside relative to the sleeve-shaped extension 48 and is displaceable in axial direction relative to the sleeve-shaped extension 48. In the initial position of the vacuum brake booster 10 shown in FIG. 1a, the openings 98 of the sleeve-shaped extension 48 are covered by the opening sleeve 96. In the initial position of the vacuum brake booster 10 the opening sleeve 96 is biased counter to actuating direction by the snap-action hooks 99. Like the sleeve-shaped extension 48, the opening sleeve 96 also has an opening 100, through which the bar 80 extends.

A first annular valve seat 54 of the control valve 20 is formed on the free end of the sleeve-shaped extension 48 coupled to the armature 36. The first valve seat 54 cooperates with a likewise annular valve sealing element 56 biased towards it by a spring 60 and may control the connection between the ambient atmosphere and the working chamber 18 of the brake booster 10. Formed radially outside of and concentrically with the first valve seat 54 and on the inside of the control valve housing 22 is a second annular valve seat 62 of the control valve 20, which valve seat 62 likewise cooperates with the valve sealing element 56 and may control the connection between the vacuum chamber 16 and the working chamber 18 of the brake booster 10.

Figure 1B:
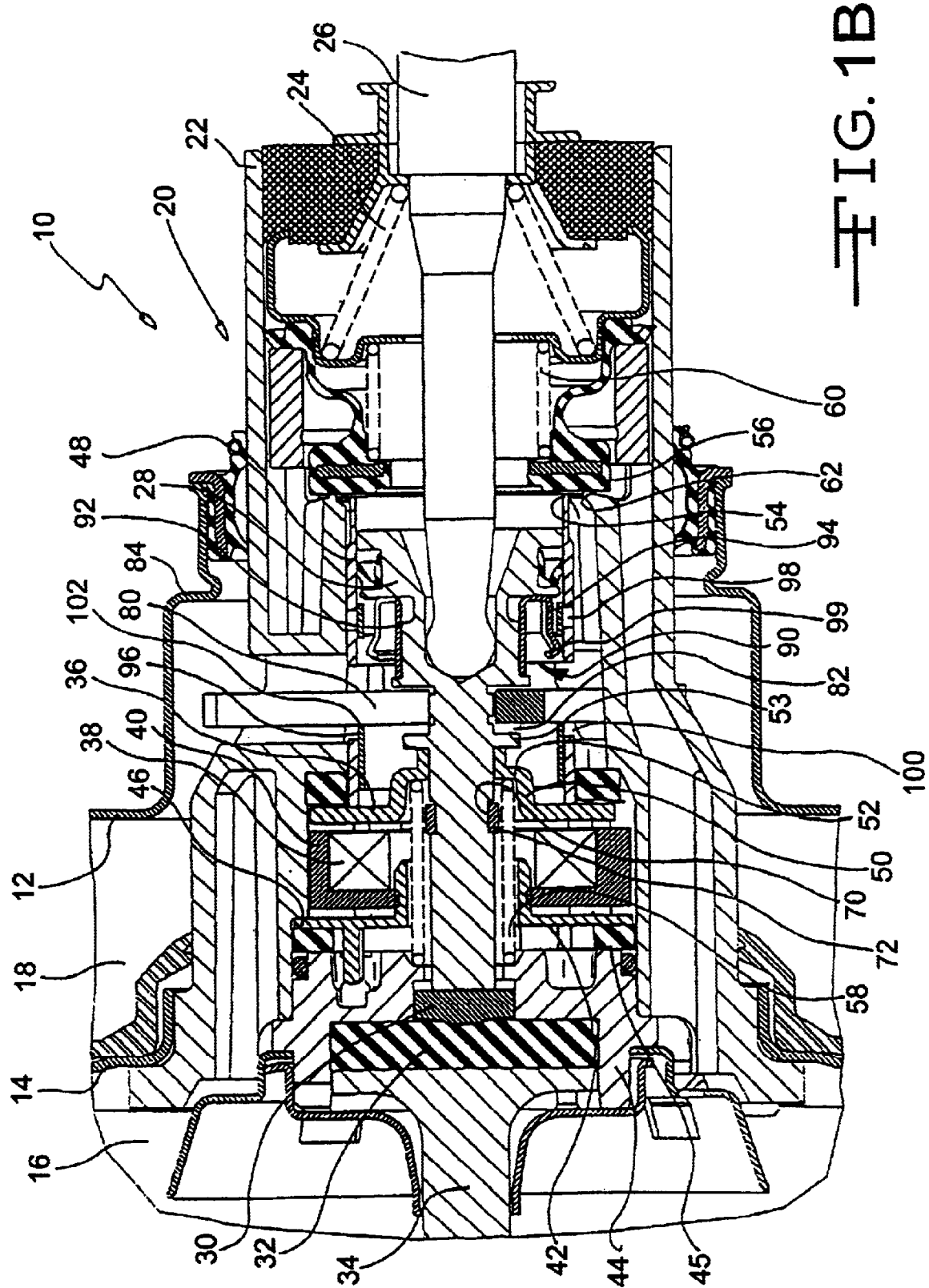
Figure 1C:
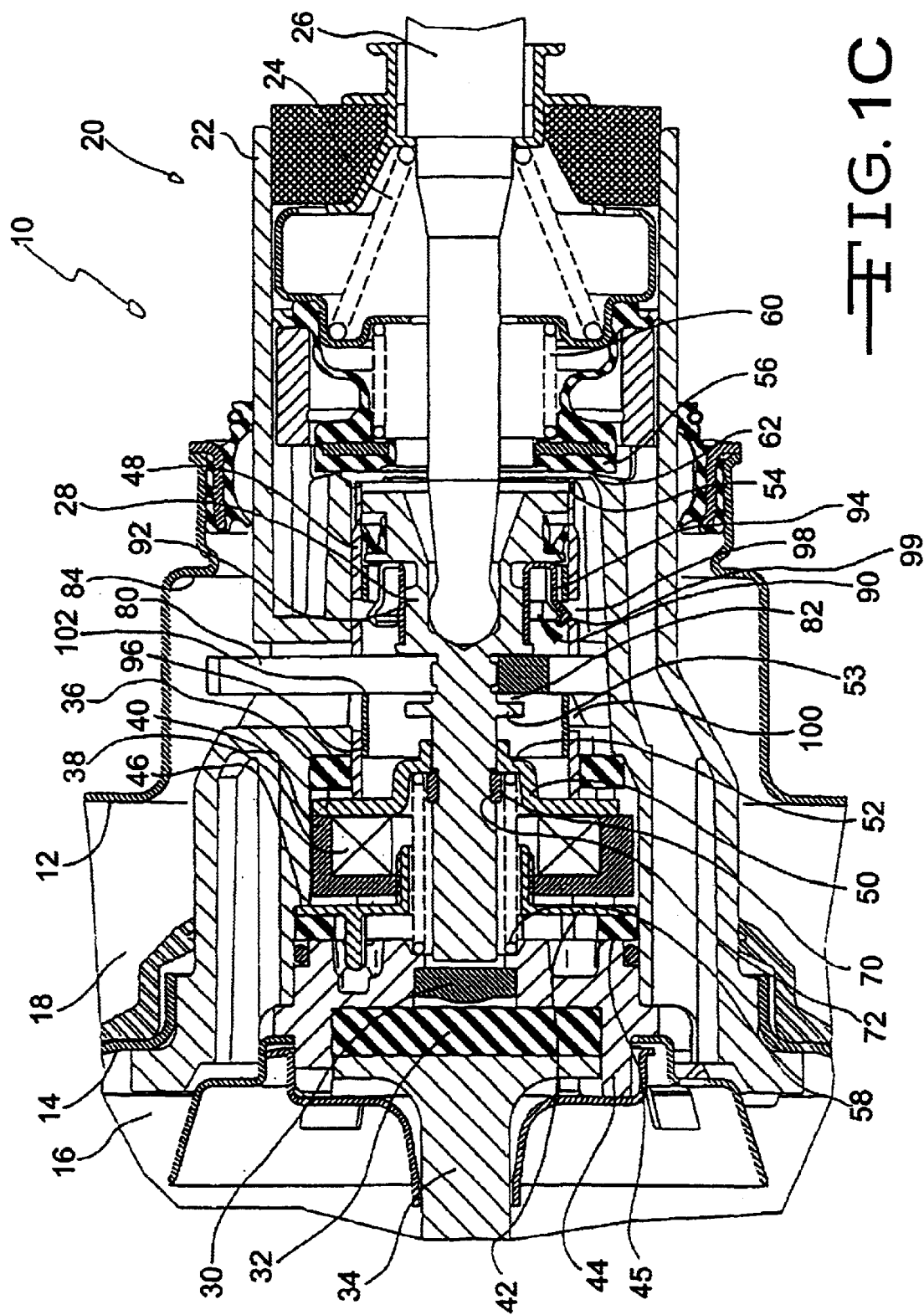
Figure 1D:
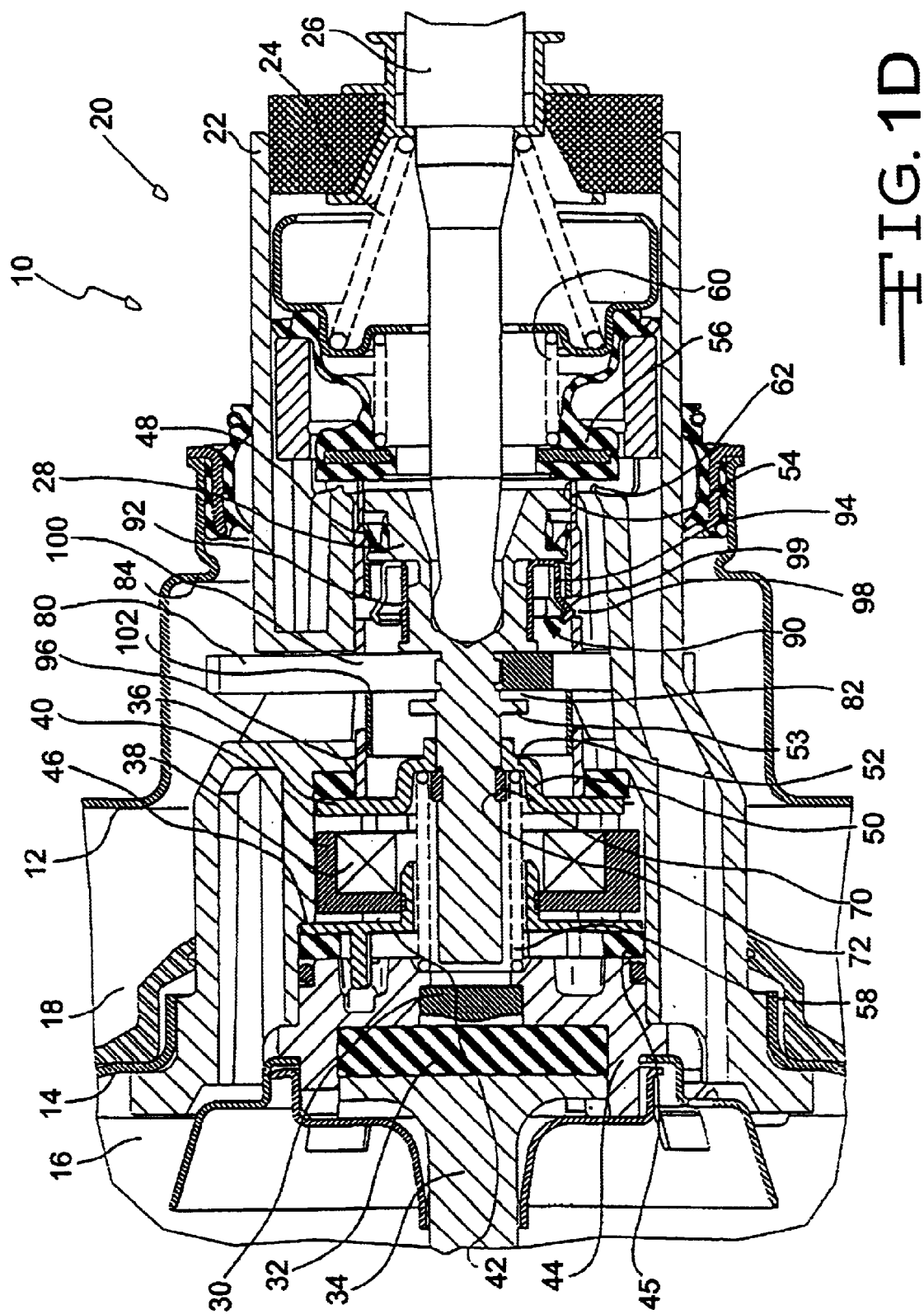

There now follows a description with reference to FIGS. 1b to 1d of the mode of operation of the vacuum brake booster 10 shown in FIG. 1a in its initial position.

During a normal actuation of the vacuum brake booster 10, the input element 26 and the actuating piston 28 coupled in actuating direction to the input element 26 are, as is shown in FIG. 1b, displaced in actuating direction, i.e. in FIG. 1b to the left. The displacement of the actuating piston 28 in actuating direction is transmitted via the stop 53 to the armature 36 as well as to the sleeve-shaped extension 48 coupled to armature 36 and to the valve seat 54 formed on the free end of the sleeve-shaped extension 48. The valve seat 54 is lifted off the valve sealing element 56 and ambient atmosphere may flow into the working chamber 18, with the result that an appropriate boosting force of the brake booster 10 arises, which results from the pressure difference actually effective at the movable wall 14. The operating position of the vacuum brake booster 10 with the valve seat 54 lifted off the valve sealing element 56 is shown in FIG. 1b.

As a result of the actuating piston 28 being displaced in actuating direction, the sleeve 92 with the radially outwardly directed swivelling arms 94, which is rigidly coupled to the actuating piston 28, is also displaced in actuating direction. The swivelling arms 94 of the sleeve 92 with their radially outer portions, i.e. the snap-action hooks 99, in said case cooperate with the opening sleeve 96 in such a way that the opening sleeve 96 is displaced counter to actuating direction relative to the actuating piston 28. The bar 80 extending through the opening 100 of the opening sleeve 96 also participates in said displacement of the opening sleeve 96 counter to actuating direction. The bar 80 is therefore displaced counter to actuating direction by the end 102 of the opening sleeve 96, which end delimits the opening 100 and faces the input element 26. The bar 80 is displaced relative to the actuating piston 28 until the axial play of the bar 80 defined by the receiving groove 82 is almost used up.

FIG. 1*b* shows the operating position of the vacuum brake booster 10 according to the invention during a normal braking operation. When actuation of the input element 26 is effected rapidly and with a relatively large stroke in a manner typical of an emergency braking operation, the operating position of the vacuum brake booster 10 shown in FIG. 1*c* arises. During an emergency braking operation, the armature 36 approaches the permanent magnet 38 to such an extent that the force of the restoring spring 58 is no longer sufficient to keep the armature 36 away from the permanent magnet 38. The force exerted by the permanent magnet 38 upon the armature 36 is then preponderant. The latter therefore uncouples from the input element 26 and comes into abutment with the permanent magnet 38. The first valve seat 54 is therefore open to the maximum extent and ambient air flows into the working chamber 18 until the maximum possible differential pressure at the movable wall 14 and hence the maximum possible boosting force of the brake booster 10 is achieved.

As a result of the coupling of the armature 36 to the permanent magnet 38, the sleeve-shaped extension 48 is displaced in actuating direction, i.e. in FIG. 1*c* to the left, relative to the actuating piston 28 and relative to the opening sleeve 96, which is retained by the snap-action hooks 99. When after the coupling of armature 36 and permanent magnet 38 the actuating force summoned up by the driver is reduced, the actuating piston 28 is displaced counter to actuating direction, i.e. in FIG. 1*c* to the right. As is shown in FIG. 1*c,* the actuating piston in said case uncouples from the sensing disk 30, and the snap-action hooks 99 may latch into the openings 98 of the sleeve-shaped extension 48. The armature subassembly and hence also the armature 36 are therefore coupled to the actuating piston 28 even before the detachment of the armature 36 from the permanent magnet 38.

Because of the displacement of the actuating piston 28 counter to actuating direction, the stop ring 70 comes into abutment with the end face of the annular collar 52 of the armature 36 facing the vacuum chamber 16, so that the forces acting counter to actuating direction upon the actuating piston 28 are introduced by means of the stop ring 70 into the armature 36. The forces introduced counter to actuating direction into the armature 36 by the actuating piston 28 are finally sufficient to release the coupling between permanent magnet 38 and armature 36 and pull the armature 36 off the permanent magnet 38.

As a result of the activated coupling device 90, i.e. as a result of the detent hooks 99 engaging the openings 98 of the sleeve-shaped extension 48, after pulling of the armature 36 off the permanent magnet 38 the armature subassembly comprising the armature 36 is no longer displaceable relative to the actuating piston 28. The possibility of the armature subassembly picking up speed in an uncontrolled manner after the pulling of the armature 36 off the permanent magnet 38 is therefore ruled out.

FIG. 1*d* shows the operating position of the vacuum brake booster 10 after the pulling of the armature 36 off the permanent magnet 38, given simultaneous coupling of the sleeve-shaped extension 48 and hence of the armature 36 to the actuating piston 28.

It is only after full release of the brake pedal that the vacuum brake booster 10 returns from the operating position shown in FIG. 1*d* back into its initial position shown in FIG. 1*a*. During said return the bar 80 is retained at the stop 84. As a result of said cooperation between the stop 84 and the bar 80, the bar 80 is displaced in actuating direction, i.e. in FIG. 1*d* to the left, inside the receiving groove 82 of the actuating piston 28 until the bar 80 comes back into abutment with the end face of the receiving groove 82 facing the input element 26 and the axial play of the bar 80 inside the receiving groove 82 is used up.

The axial displacement of the bar 80 inside the groove 82 relative to the actuating piston 28 is transmitted to the opening sleeve 96 whose end 102 facing the input element 26 and delimiting the opening 100 still lies against the bar 80. The opening sleeve 96 is consequently displaced in actuating direction relative to the sleeve-shaped extension 48 and to the actuating piston 28. The snap-action hooks 99 are therefore pressed by the opening sleeve 96 out of the openings 98 of the sleeve-shaped extension 48 and the coupling between the actuating piston 28 and the sleeve-shaped extension 48 and hence also the armature 36 is cancelled. This corresponds to the initial position of the vacuum brake booster 10 shown in FIG. 1*a*.

Figure 2:
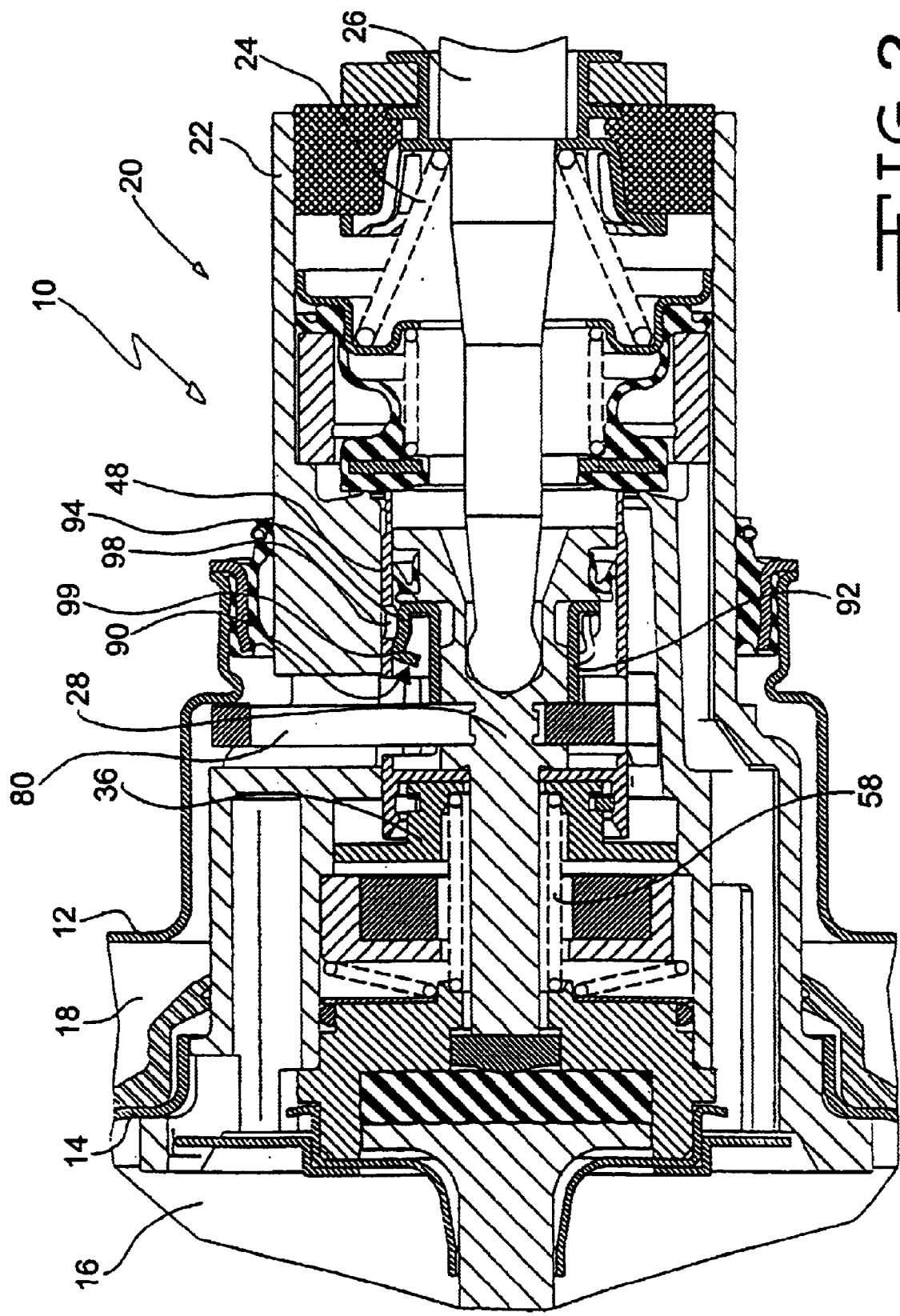
FIG. 2 a longitudinal section through the control valve of a second embodiment of a vacuum brake booster according to the invention in its initial position.

FIG. 2 shows a second embodiment of a vacuum brake booster 10 according to the invention. The second embodiment is substantially identical in function and construction to the first embodiment. As in the first embodiment, the coupling device 90 takes the form of a detent device, wherein to form a detent connection between the actuating piston 28 and the sleeve-shaped extension 48 of the armature 36 a snap-action hook 99 latches into an opening 98 provided in the sleeve-shaped extension 48. As in the first embodiment, the radially outwardly biased snap-action hook 99 is formed by a radially outer end of a swivelling arm 94, which is constructed integrally with a sleeve 92 rigidly coupled to the actuating piston 28.

Departing from the first embodiment, the bar 80 is coupled in an axially non-displaceable manner to the actuating piston 28. Furthermore, the opening sleeve provided in the first embodiment for releasing the snap-action hook 99 from the opening 98 of the sleeve-shaped extension 48 has been dispensed with. In the second embodiment, release of the detent connection between the snap-action hook 99 and the opening 98 is effected during a return stroke of the input element 26 by the force surplus, which acts upon the actuating piston 28 and is generated by the restoring springs 24 and 58. The restoring springs 24 and 58 are dimensioned in such a way that the spring forces summoned up by them are sufficient, subsequent to a return stroke of the input element 26, to press the snap-action hooks 99 out of the openings 98 of the sleeve-shaped extension 48.

A third embodiment of a vacuum brake booster 10 according to the invention is shown in various operating positions in FIGS. 3*a* to 3*d*. The vacuum brake booster 10 according to the third embodiment is substantially identical in function and construction to the vacuum brake boosters of the first two embodiments.

In the third embodiment, the coupling device 90 likewise takes the form of a detent device and comprises a first detent element in the form of a snap-action hook 99, which is formed on the end of a substantially axially extending swivelling arm 94, as well as a complementary second detent element in the form of an opening 98 provided in the sleeve-shaped extension 48.

Departing from the first two embodiments, the snap-action hook 99 latches relative to the sleeve-shaped extension 48 not radially from the inside but radially from the outside into the opening 98 of the sleeve-shaped extension 48. Furthermore, the swivelling arm 94 is not fastened to a sleeve coupled to the actuating piston 28 but is constructed integrally with a stop body 110 extending substantially at right angles to the swivelling arm 94. The stop body 110 is disposed on a surface, facing the input element 26, of a spring plate 112 extending at right angles to the longitudinal axis of the actuating piston 28. The spring plate 112 is fastened in the middle between two limbs of the locking bar 80 and, like the locking bar 80, rigidly coupled to the actuating piston 28.

Figure 3A:
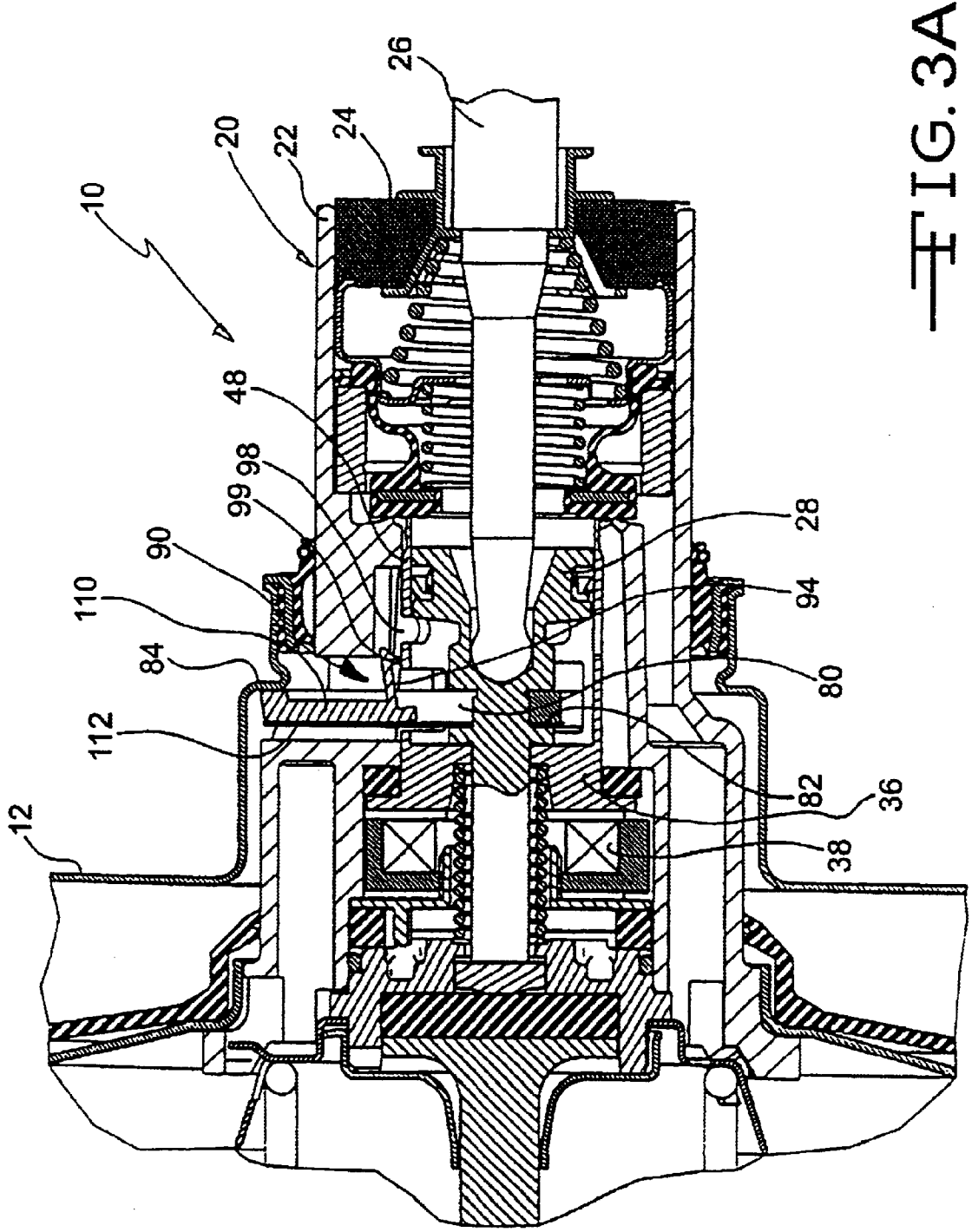
FIGS. 3a–3d longitudinal sections through the control valve of a third embodiment of a vacuum brake booster according to the invention.

In the initial position of the vacuum brake booster 10 shown in FIG. 3a, the biased spring plate 112 together with the locking bar 80 is clamped in such a manner into a groove 82 of the actuating piston 28 that the spring plate 112, after separation of the stop body 110 from a stop 84 formed in the housing 12 of the vacuum brake booster 10, can execute a swivelling motion counter to actuating direction. In FIG. 3a, said swivelling motion is still prevented owing to the abutment of the snap-action hook 99 with a radially outer surface of the sleeve-shaped extension 48.

Figure 3B:
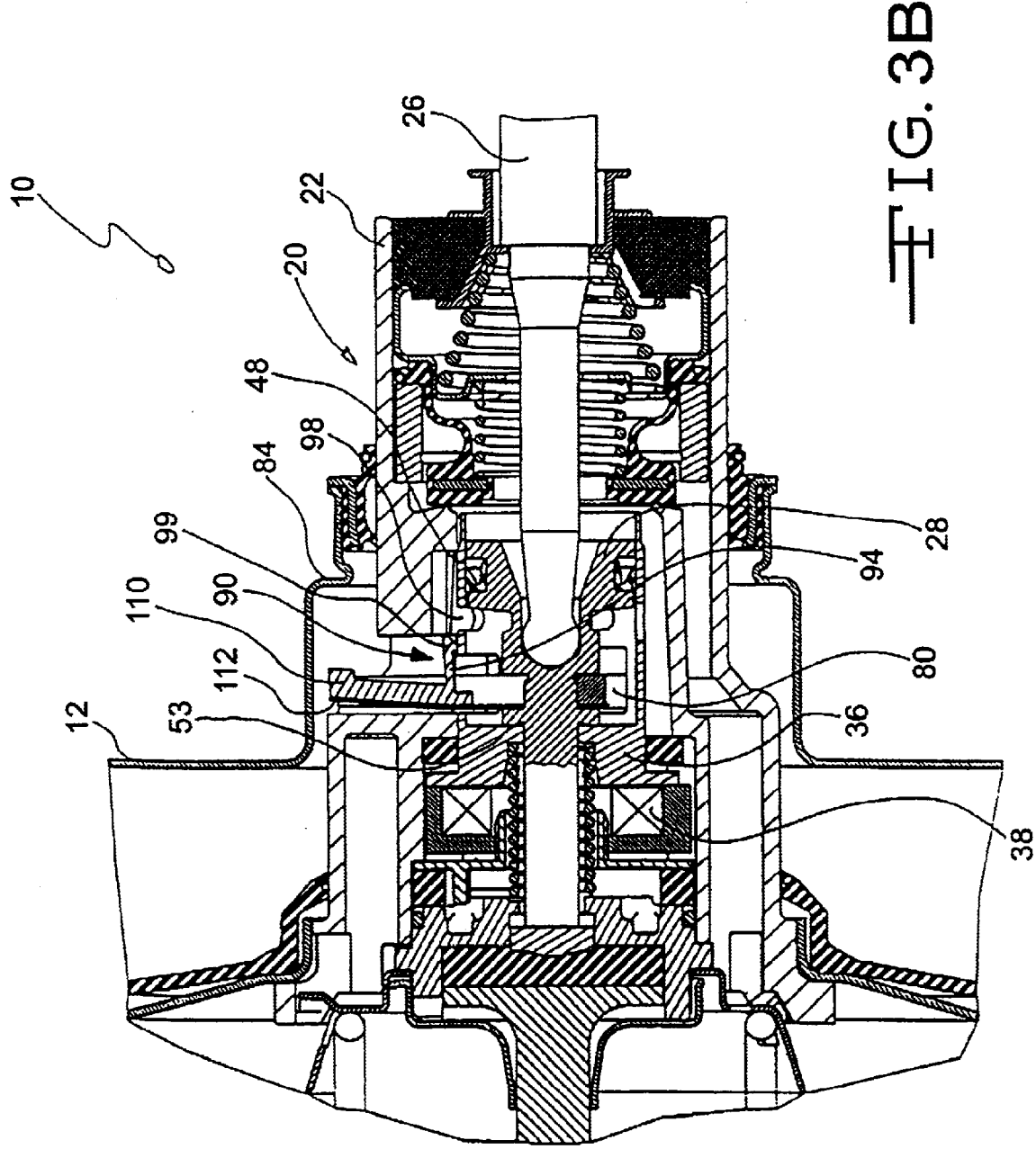

The operating position of the vacuum brake booster 10 shown in FIG. 3b arises after an emergency braking operation, in which the armature 36 has come into abutment with the permanent magnet 38. The control valve housing 22 is displaced in actuating direction, i.e. in FIG. 3b to the left, relative to the housing 12 of the vacuum brake booster 10. The stop body 110 of the spring plate 112 then detaches from the stop 84 formed in the housing 12 of the vacuum brake booster 10 and the swivelling arm 94 bends the snap-action hook 99 further towards a radially outer surface of the sleeve-shaped extension 48.

Figure 3C:
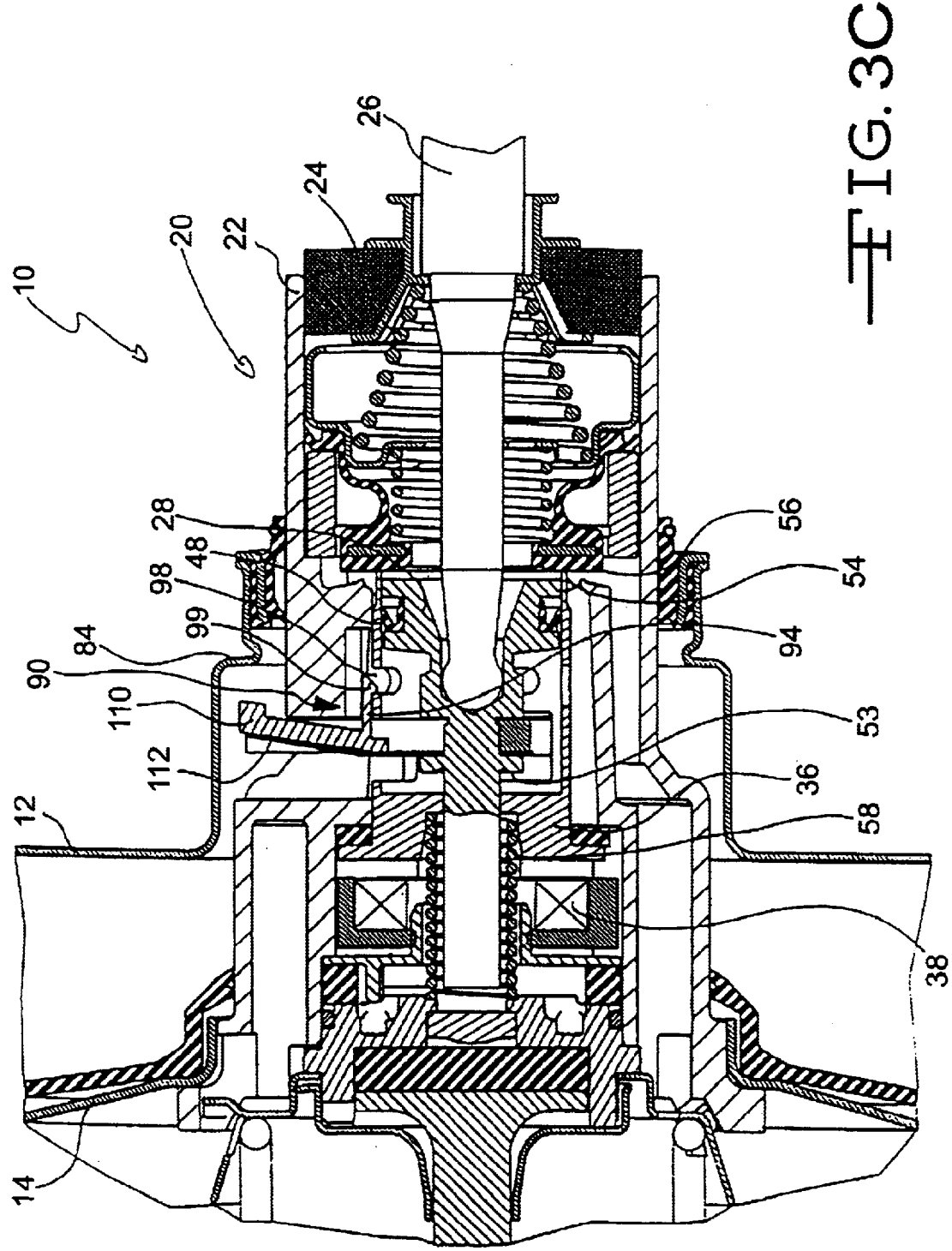
Figure 3D:
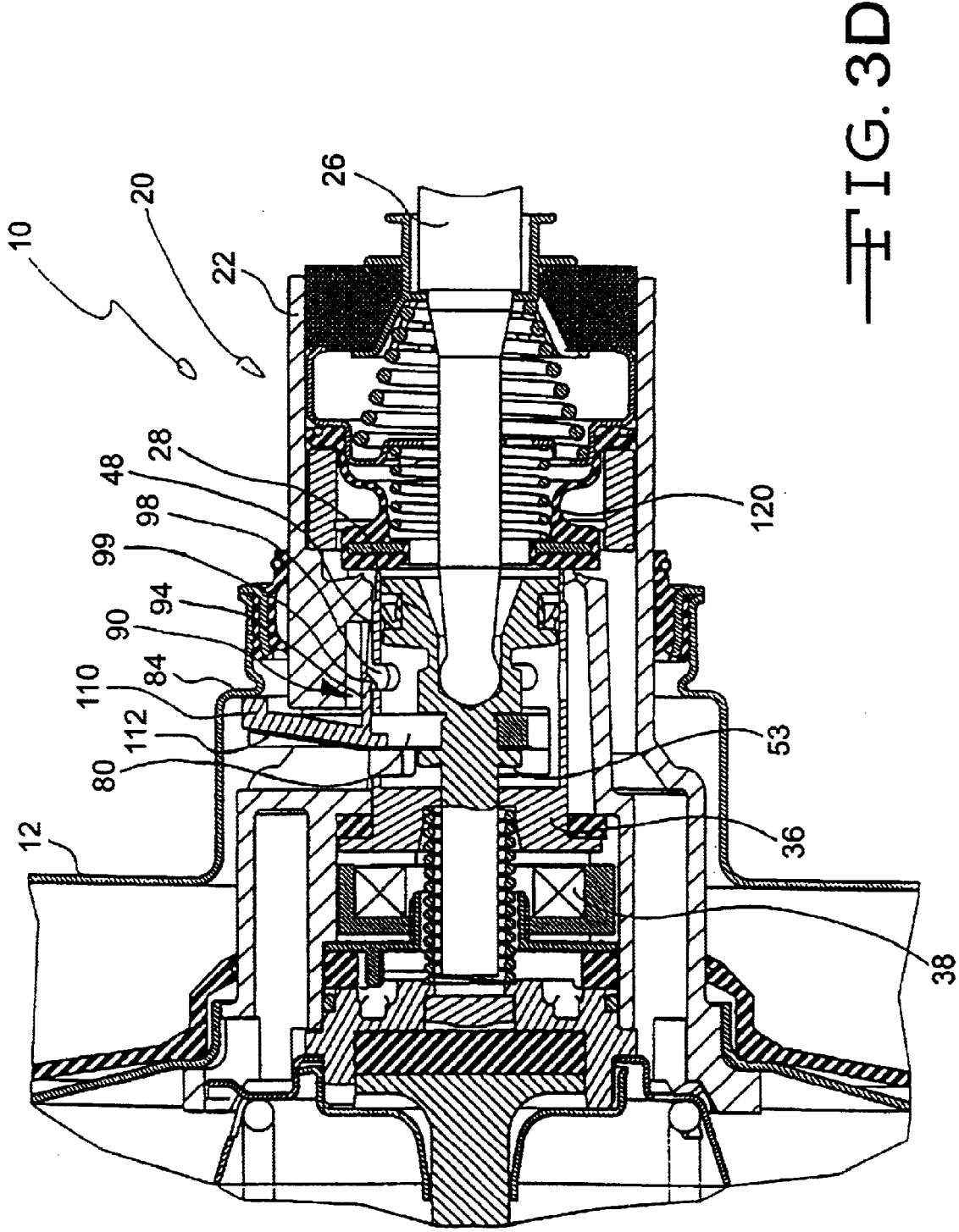

When the emergency braking operation is ended by the driver easing off the brake pedal, the input element 26 is displaced counter to actuating direction, i.e. in FIG. 3b to the right, relative to the sleeve-shaped extension 48. As a result of the return stroke of the input element 26 and restoring forces of the restoring springs 24 and 58, the actuating piston 28 and the swivelling arm 94 rigidly coupled to the actuating piston 28 are also displaced counter to actuating direction relative to the armature 36 and to the sleeve-shaped extension 48. This leads to the operating position of the vacuum brake booster 10 shown in FIG. 3c, in which the snap-action hook 99 formed on the swivelling arm 94 latches into the opening 98 of the sleeve-shaped extension 48 and the armature 36 is coupled counter to actuating direction to the actuating piston 28. As a result of said coupling, the armature 36 even after detaching from the permanent magnet 38, as shown in FIG. 3c, is no longer displaceable relative to the actuating piston 28. An undesirable impacting of the armature 36 against the stop 53 formed for the armature 36 on the actuating piston 28 may therefore be avoided. An uncontrolled impacting of the sleeve-shaped extension 48 of the armature 36 against the valve sealing element 56 is moreover ruled out. Rather, it is only after a metered return stroke of the input element 26 that the valve seat 54 formed on the sleeve-shaped extension 48 may run up against the valve sealing element 56, displace the valve sealing element 56 counter to actuating direction and open the valve seat 62 to reduce the pressure difference at the movable wall 14.

After the reduction of the pressure difference at the movable wall 14 as a result of the return stroke of the input element 26, the movable wall 14 and the control valve housing 22 rigidly coupled to the movable wall 14 move counter to actuating direction back into the initial position, shown in FIG. 3a, of the vacuum brake booster 10. Before this, however, the operating position shown in FIG. 3d arises, in which the stop body 110 comes into abutment with the stop 84 formed in the housing 12 of the vacuum brake booster 10. Upon further displacement of the actuating piston 28 counter to actuating direction, the swivelling arm 94 rigidly coupled to the stop body 110 is then swivelled radially outwards. Because of said swivelling motion of the swivelling arm 94, the snap-action hook 99 integrally formed with the swivelling arm 94 also moves radially outwards and is withdrawn from the opening 98 of the sleeve-shaped extension 48. The coupling between actuating piston 28 and armature 36 is consequently cancelled. The sleeve-shaped extension 48 is then displaced via the valve sealing element 56 against the restoring spring 120 until the armature 36 comes into abutment with the stop 53 formed on the actuating piston 28. This corresponds to the initial position of the vacuum brake booster 10 shown in FIG. 3a.

Figure 4A:
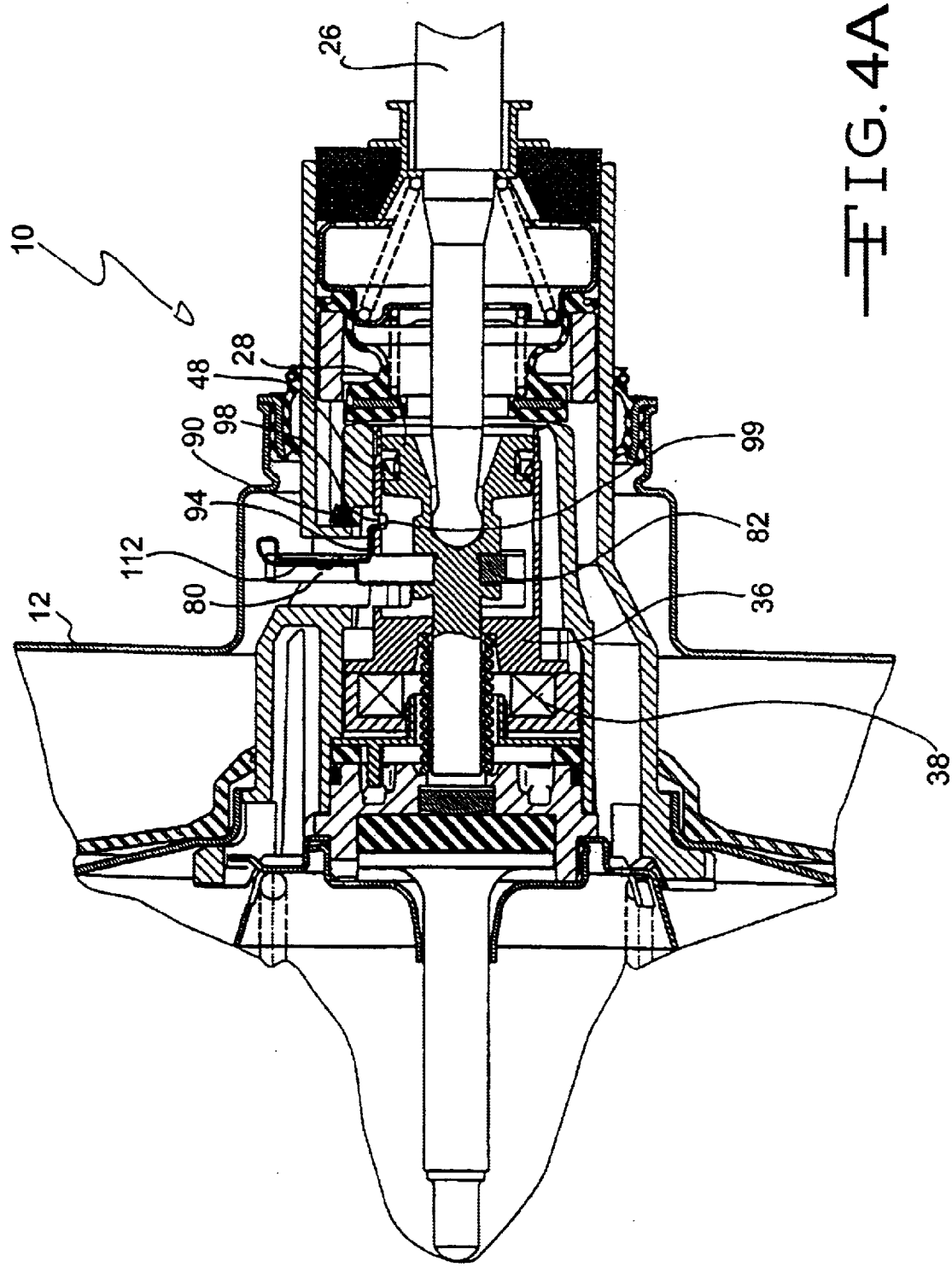
FIG. 4a a longitudinal section through the control valve of a fourth embodiment of a vacuum brake booster according to the invention in its initial position.

FIG. 4a shows a fourth embodiment of a vacuum brake booster 10 according to the invention in an operating position according to FIG. 3c. The vacuum brake booster 10 according to the fourth embodiment is as regards construction and operation substantially identical to the vacuum brake booster of the third embodiment. Departing from the third embodiment, the resilient swivelling arm 94, which has the snap-action hook 99 disposed thereon, and the spring plate 112 are formed by a single sheet-metal part. In contrast to the third embodiment, it is therefore possible to dispense with the provision of an additional support on the spring plate.

Figure 4B:
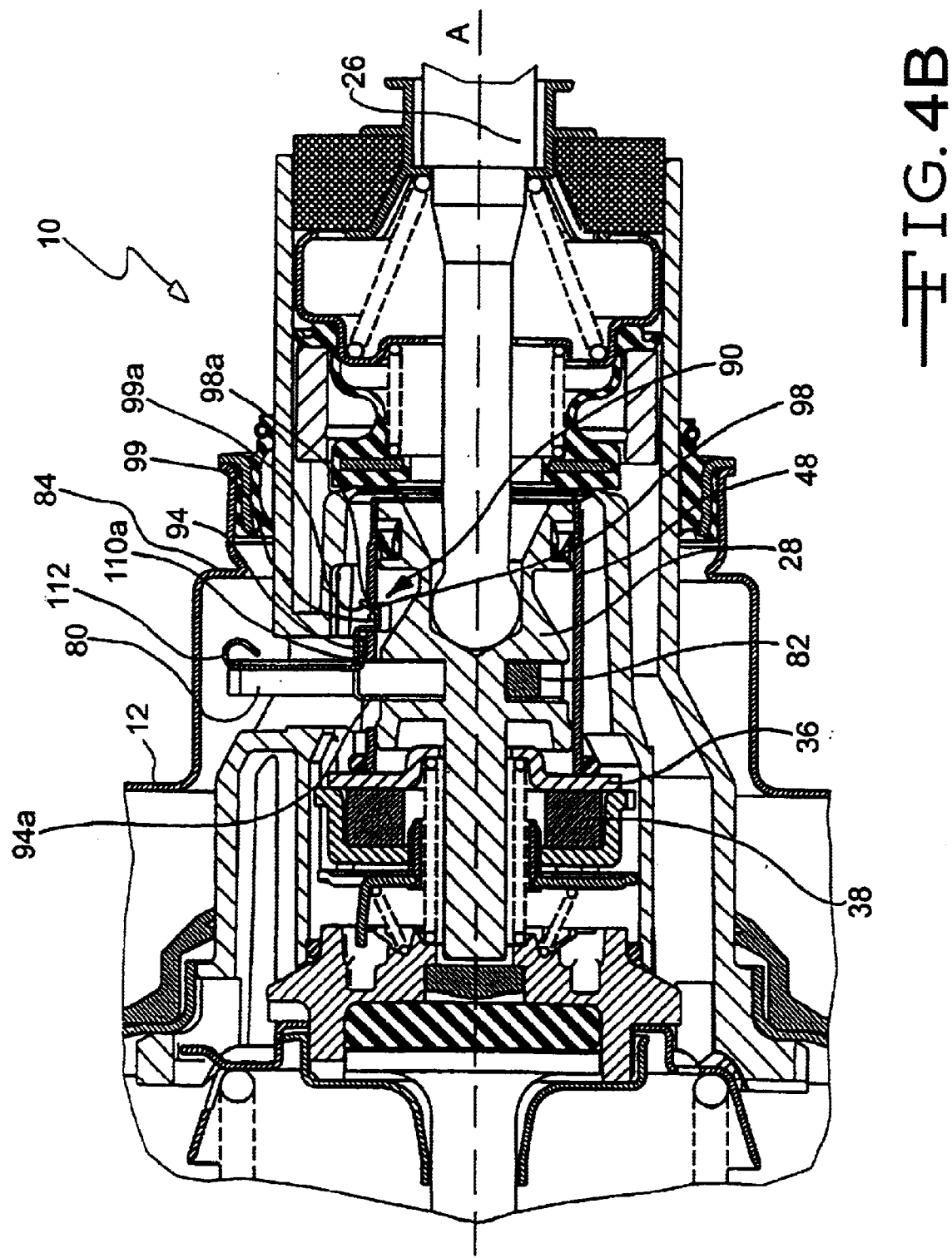
FIGS. 4b and 4c longitudinal sections through the control valve of embodiments of further vacuum brake boosters according to the invention based on the fourth embodiment.

FIG. 4b shows an embodiment of a vacuum brake booster 10 according to the invention slightly modified with respect to the embodiment of FIG. 4a in the operative position of FIG. 3c. To avoid the complex bending process for manufacturing a sheet metal part which in FIG. 4a forms the spring arm 94 and the spring plate 112, in the coupling device 90 according to FIG. 4b the spring arm 94 and the spring plate 112 are manufactured as two separate sheet metal parts connected by welding. The swivelling arm 94 extending in longitudinal direction has a collar 94a which, for pivotably attaching the swivelling arm 94 to the actuating piston 28, is clamped within the receiving groove of the actuating piston 28 for the bar 80. The swivelling arm 94 is thus directly connected with the actuating piston 28 so that all retaining forces acting on the swivelling arm 94 and/or the snap-action hook 99 can reliably be introduced into the actuating piston.

The snap-action hook 99 is embodied by a U-shaped profile. The U-shaped profile is formed on an end of the swivelling arm 94 facing the input element 26 and includes a limb 99A extending obliquely with respect to the longitudinal axis A of the vacuum brake booster 10.

In the activated position of the emergency braking aid shown in FIG. 4b, i.e. when permanent magnet 38 and armature 36 are coupled, the snap-action hook 99 engages in the corresponding opening 98 of the sleeve-shaped extension 48. As a result, the coupling device 90 is activated and the armature 36 coupled to the actuating piston 28. Owing to the limb 99A of the U-shaped profile forming the snap-action hook 99 extending obliquely to the longitudinal axis A, it is guaranteed that the snap action hook 99 fills the opening 98 always completely, i.e. without play. Different dimensions of the opening 98 due to tolerances in size can thus be compensated. The snap-action hook 99 could of course also be formed by an essentially V-shaped profile instead of by an essentially U-shaped profile, and have two limbs extending obliquely to each other and to the longitudinal axis A.

In order to have the coupling device 90 according to FIG. 4b assume its uncoupled state, the spring plate 112 cooperates, as described above, with the stop 84 formed on the housing 12 of the vacuum brake booster 10. This cooperation effects that the swivelling arm 94 is resiliently bent radially outwardly and the snap-action hook 99 is finally pulled out of the opening 98 of the sleeve-shaped extension 48. The snap-action hook 99 then rests under bias on the sleeve-shaped projection 48 in the initial position (rest position) of the vacuum brake booster 10.

Figure 4C:
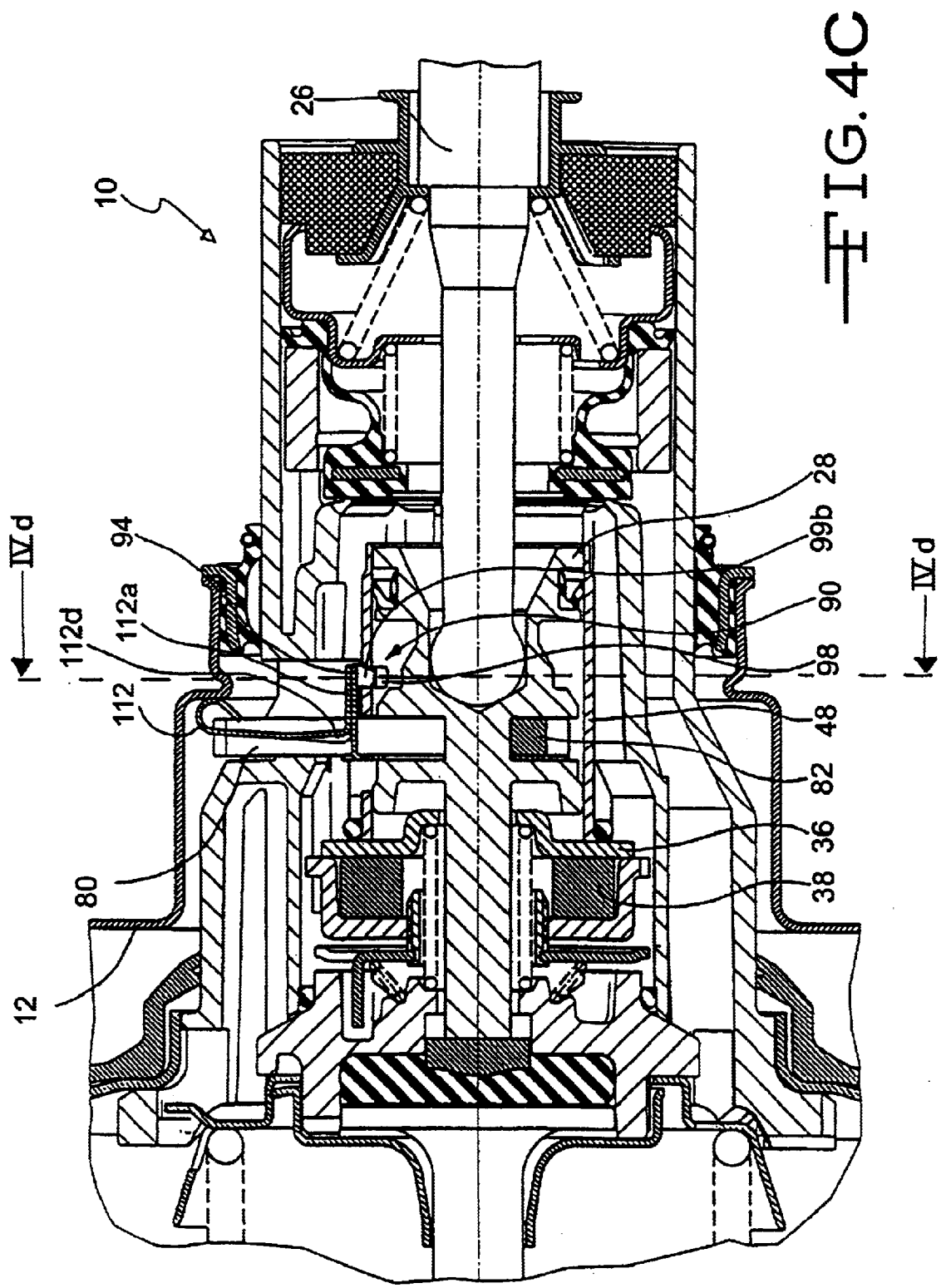

FIG. 4c illustrates a further embodiment of a vacuum brake booster 10 according to the invention. It is somewhat modified with respect to the fourth embodiment of FIG. 4a and the embodiment of FIG. 4b The swivelling arm 94 and the arm formed by the spring plate 112 are again designed as separate components and an area 112a of the spring plate 112 extending parallel to the swivelling arm is connected to the swivelling arm 94 by welding. The section of the spring plate 112 extending vertically to the swivelling arm 94 has at its end facing the swivelling arm 94 a bead 112b which stiffens said section of the swivelling arm 112 locally. The resulting reduction of the elasticity of the spring plate 112 increases the cut-off safety of the coupling device 90.

The manufacture of the snap-action hook 99 of the vacuum brake booster according to FIG. 4c is explained in greater detail in the following with reference to FIGS. 4d to 4f.

As can be seen in FIG. 4e, the swivelling arm 94 is designed as a strip-shaped spring plate. At its end facing the input element 26 the swivelling arm 94 is provided with a T-shaped end portion made e.g. by punching. Regions 94a and 94b extending beyond the width of the swivelling arm 94 are bevelled downwardly after punching, as shown in FIG. 4f. Each one of the two bevelled regions 94a, 94b forms a snap-action hook 99b, 99c. As is shown in cross-section in FIG. 4d, the two snap-action hooks 99b, 99c engage in the coupled position of the coupling device 90 into the opening 98 of the sleeve-shaped projection 48.

The manufacture of the snap-action hooks 99b, 99c described with reference to FIGS. 4d and 4f improves their dimensional accuracy since the shape of the snap-action hooks 99b, 99c is defined by the punching action rather than by the bending action. Dimensional stability is generally low where bending processes are concerned due to the spring-back effects. Unbending due to the spring-back effects does not affect the dimensional accuracy of the coupling aimed at by the invention, however. This is due to the fact that unbending in FIG. 4d takes place to the left and right which does not affect the dimensional stability in directions vertical to the drawing plane.

The vacuum brake boosters according to the third (FIG. 3a–3d) and the fourth (FIGS. 4a–4f) embodiments can be modified in such a manner that, as in the first embodiment, a stop disposed in front of the armature 36 and formed on the actuating piston 28 is provided on the actuating piston 28 for detaching the armature 36 from the permanent magnet 38.

Figure 5A:
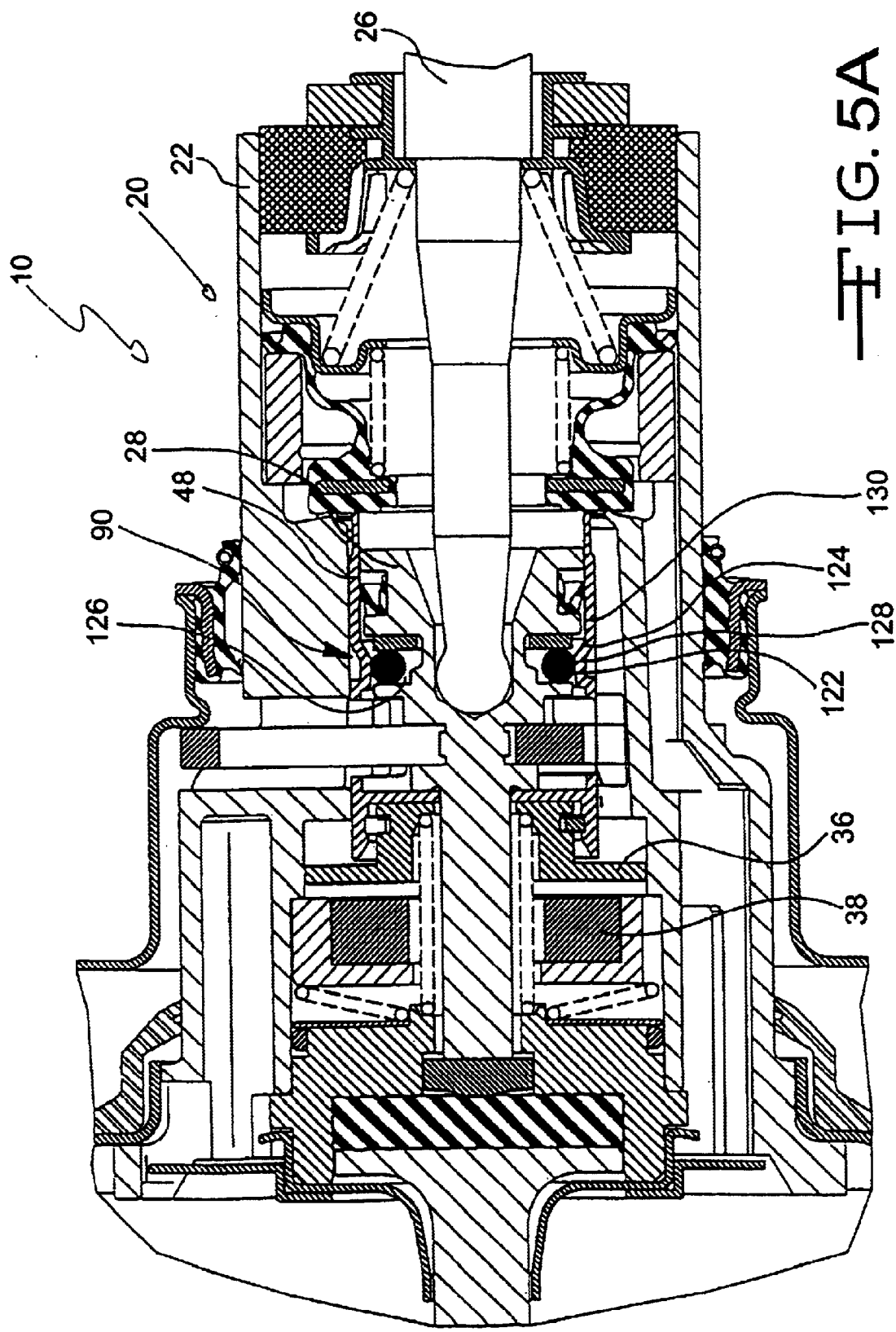
FIGS. 5a and 5b longitudinal sections through the control valve of a fifth embodiment of a vacuum brake booster according to the invention.
Figure 5B:
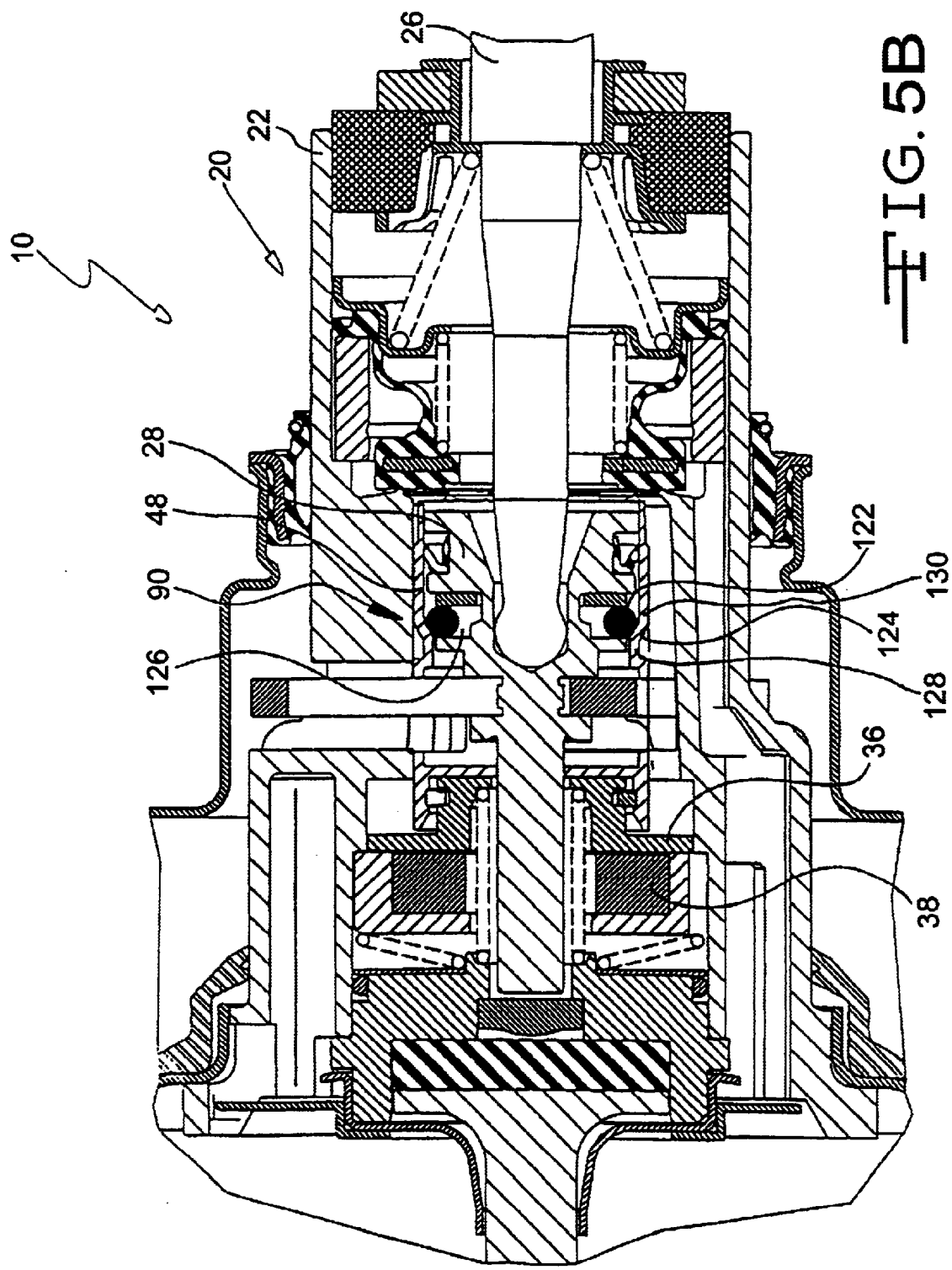

FIGS. 5a and 5b show a fifth embodiment of a brake booster 10 according to the invention in an initial position as well as in an operating position of the vacuum brake booster 10. The vacuum brake booster 10 according to the fifth embodiment is similar in construction and operation to the vacuum brake boosters according to the previous embodiments.

As in the previous embodiments, the coupling device 90 takes the form of a detent device. The coupling device 90 comprises a first detent element in the form of an expanding ring 122 as well as a complementary second detent element in the form of a bevel 124 formed within the cylindrical extension 48. The expanding ring 122 is disposed in an axially non-displaceable manner in a circumferential annular groove 126 formed in the actuating piston 28 and is biased radially outwards towards a radially inner surface of the sleeve-shaped extension 48.

The expanding ring 122 contacts a cylindrical portion 128 of the sleeve-shaped extension 48 in the initial position of the vacuum brake booster 10 shown in FIG. 5a, which portion is disposed in actuating direction downstream of the bevel 124 and has a smaller inside diameter than the cylindrical portion 130 disposed in actuating direction upstream of the bevel 124.

The operating position of the vacuum brake booster 10 shown in FIG. 5b in which the armature 36 is situated in abutment with the permanent magnet 38 arises in an emergency braking situation. As a result of the displacement of the sleeve-shaped extension 48 which is due to the coupling of the armature 36 to the permanent magnet 38, the bevel 124 is displaced to such an extent in actuating direction that the expanding ring 122 may expand radially outwards in the region of the bevel 124. The expansion of the expanding ring 122 in the region of the bevel 124 effects a coupling of the sleeve-shaped extension 48 and hence also of the armature 36 to the actuating piston 28, with the result that a displacement of the sleeve-shaped extension 48 relative to the actuating piston 28 is ruled out. The reason for this is that the axial forces acting, after detachment of the armature 36 from the permanent magnet 38, counter to actuating direction upon the armature 36 are not sufficient to press the expanding ring 122 by means of the bevel 124 back into the annular groove 126.

It is only after release of the brake pedal and a resultant return stroke of the input element 26 that the expanding ring 122 may be compressed by means of the restoring spring forces introduced into the sleeve-shaped extension 48 to such an extent by the bevel 124 that the diameter of the expanding ring 122 corresponds to the inside diameter of the cylindrical portion 128 of the sleeve-shaped extension 48 disposed in actuating direction downstream of the bevel 124 and the initial position of the vacuum brake booster 10 shown in FIG. 5a arises.

Figure 6A:
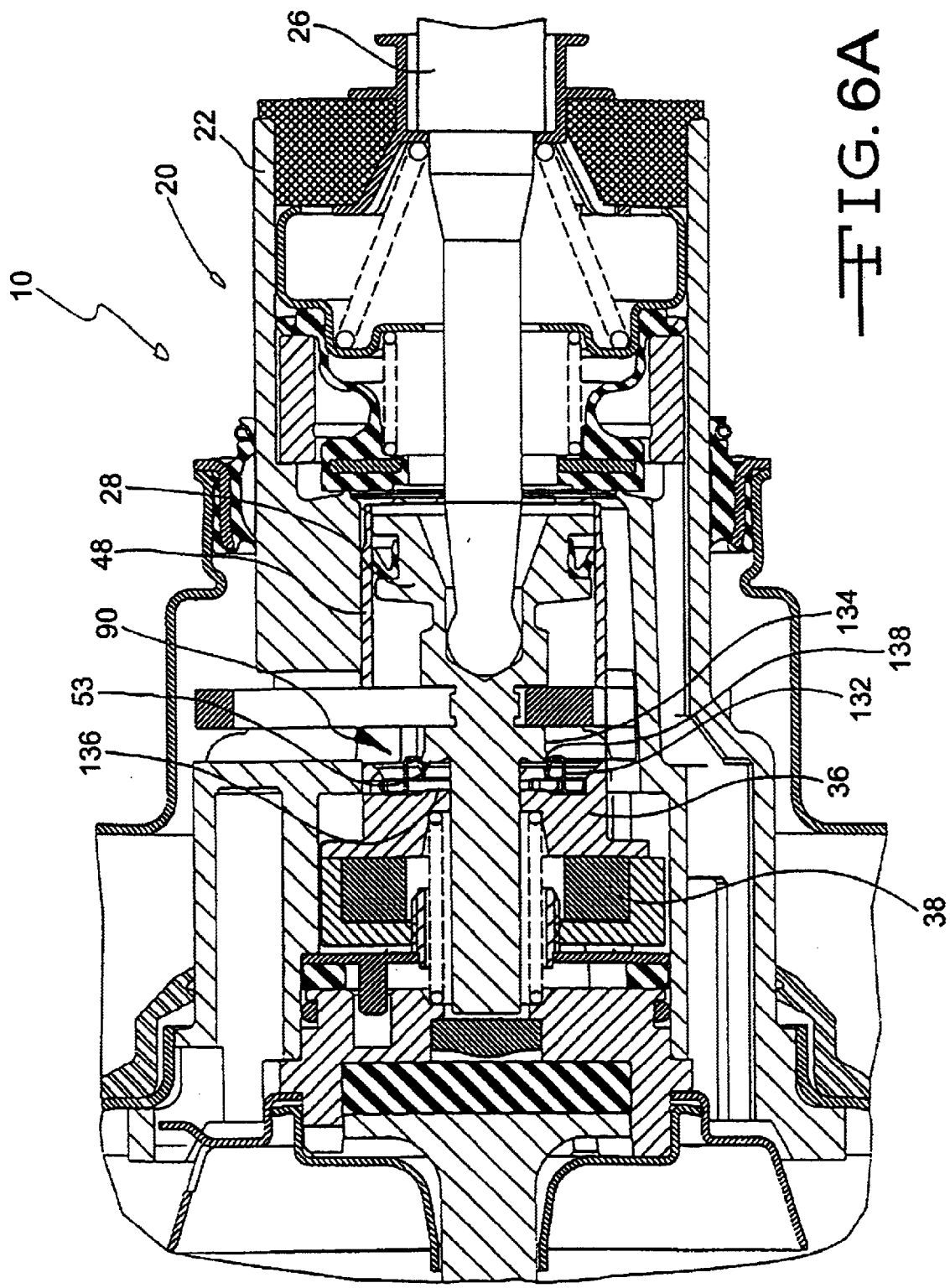
FIGS. 6a and 6b longitudinal sections through the control valve of a sixth embodiment of a vacuum brake booster according to the invention.
Figure 6B:
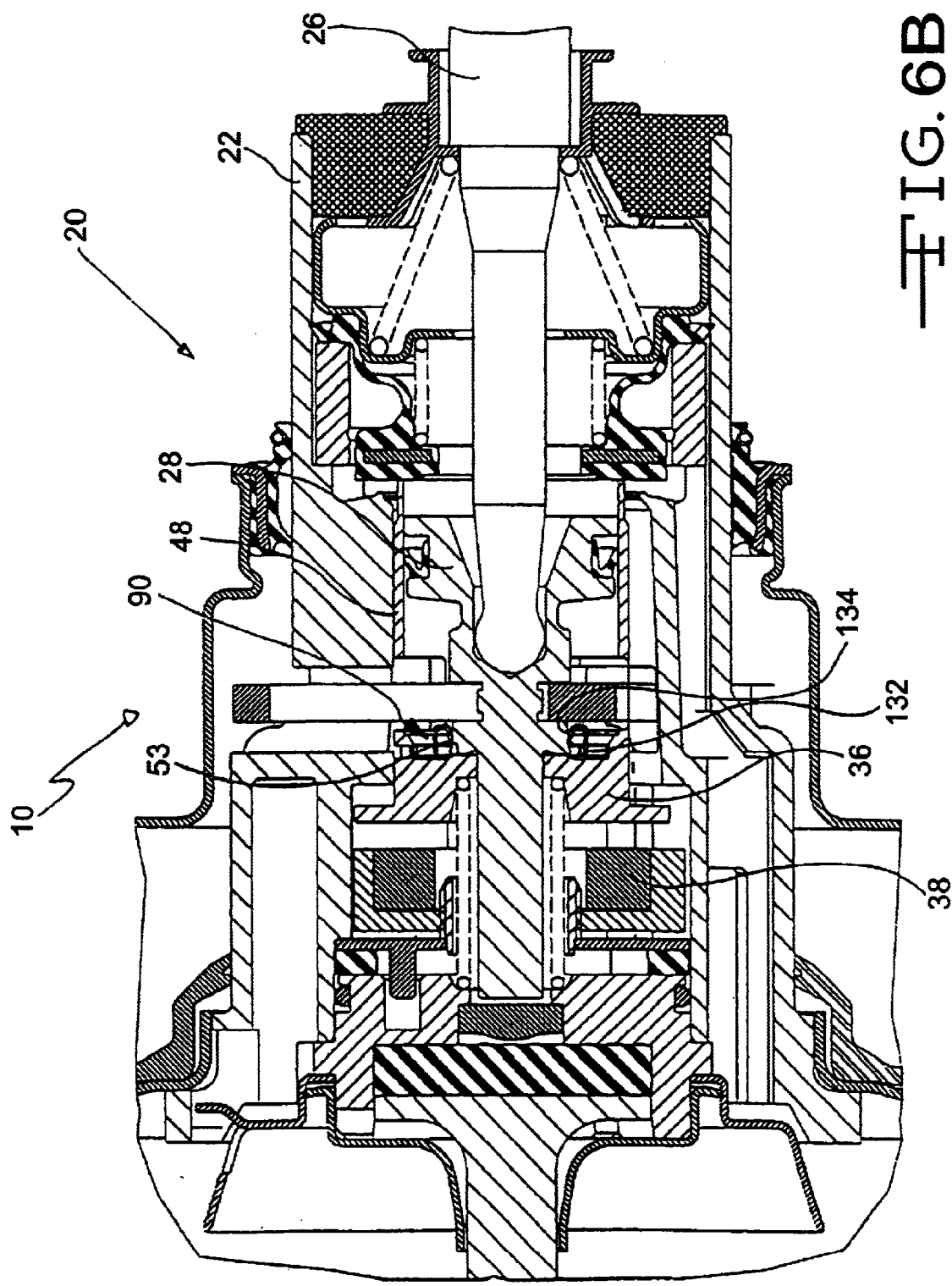

FIGS. 6a and 6b show a sixth embodiment of a vacuum brake booster 10 according to the invention. The vacuum brake booster 10 according to the embodiment shown in FIGS. 6a and 6b is substantially identical in construction and function to the vacuum brake boosters of the previous embodiments.

The vacuum brake booster 10 according to the sixth embodiment likewise comprises a coupling device 90 in the form of a detent device. The detent device comprises a first detent element in the form of a spring washer 132 as well as a complementary second detent element in the form of an indentation 134 designed as a groove. The spring washer 132 is fastened to an end face 136 of the armature 36 facing the input element 26 and has a radially inner portion in the form of a snap ring 138, which is designed for engagement into the indentation 134 formed in the actuating piston 28.

FIG. 6a shows the operating position of the vacuum brake booster 10 during an emergency braking operation. The armature 36 has been pulled into abutment with the permanent magnet 38 as a result of the emergency braking operation. In said case, the snap ring 138 has sprung out of the indentation 134. When the driver ends the emergency braking operation, the armature 36 is pulled off the permanent magnet 38. The armature 36 then moves counter to actuating direction until it comes into abutment with the stop 53 formed on the actuating piston 28 (FIG. 1b). However, before the armature 36 can come into abutment with the stop 53, deformation work is required to achieve the expansion of the snap ring 138 needed to allow the snap ring 138 to latch into the indentation 134. The deformation work is effected by the armature 36, which after having been pulled off is accelerated counter to actuating direction, with the result that the impact of the armature 36 against the stop 53 is damped.

Figure 7:
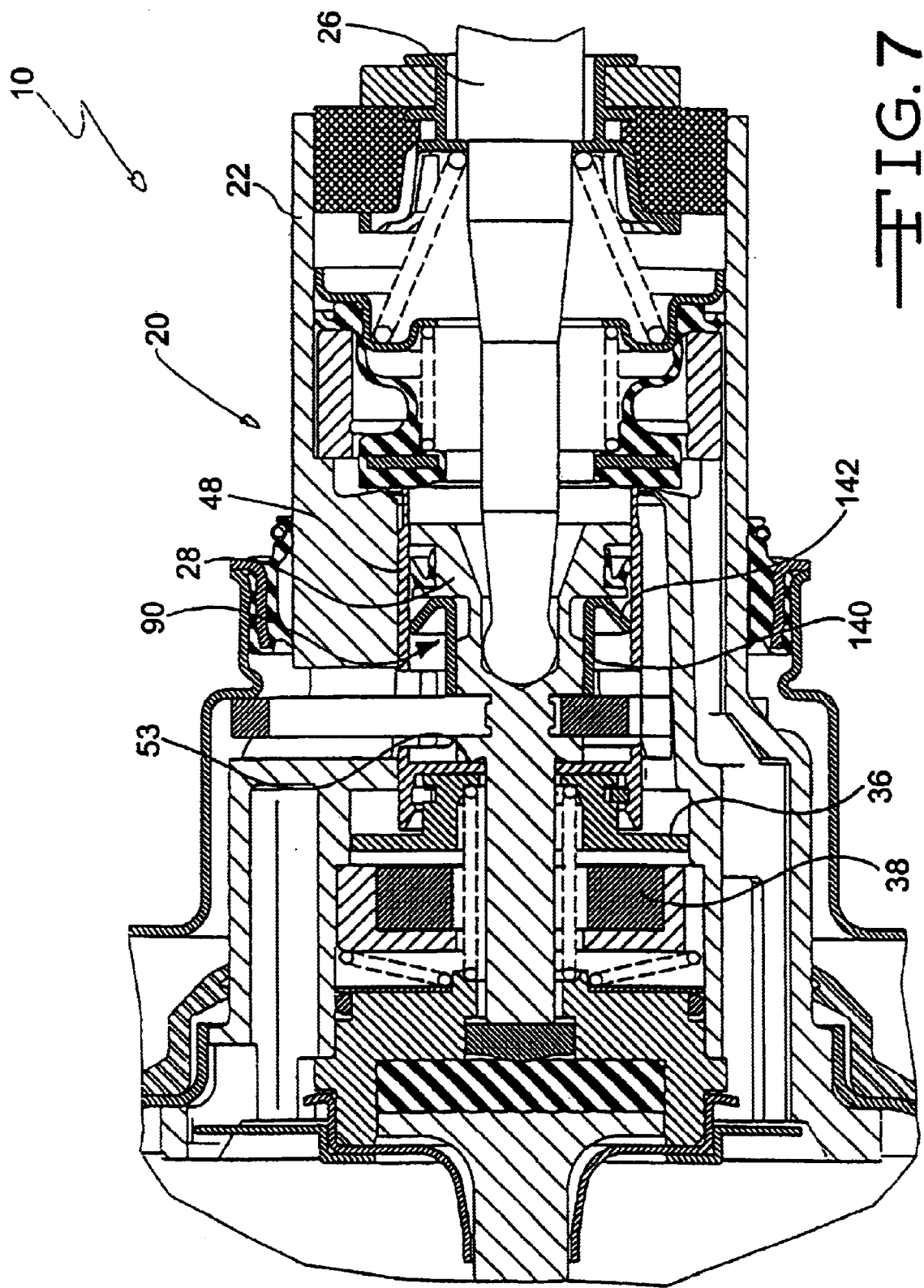
FIGS. 7–9 longitudinal sections through the control valve of a seventh, eighth and ninth embodiment of a vacuum brake booster according to the invention in its initial position.

FIG. 7 shows a seventh embodiment of a vacuum brake booster 10 according to the invention. The vacuum brake booster according to FIG. 7 substantially corresponds in construction and function to the previous embodiments. Departing from the previous embodiments, however, the coupling device 90 is designed not as a detent device but as a clamping device. The clamping device 90 comprises a sleeve 140, which is rigidly coupled to the actuating piston 28 and fastened to the radially outer side of the actuating piston 28 and is formed integrally with a plurality of clamping elements 142 in the form of radially outwardly projecting clamping arms 142. The clamping arms 142 abut under initial tension the radially inner side of the sleeve-shaped extension 48. The clamping arms 142 consequently generate a clamping force in a radially outward direction.

The clamping arms 142 run obliquely into the sleeve-shaped extension 48. Asymmetrical clamping properties are linked with said oblique position of the clamping arms 142. Whereas the clamping force of the clamping arms 142 upon a movement of the sleeve-shaped extension 48 in actuating direction relative to the actuating piston is relatively low, the clamping arms 142 generate a relatively high clamping force upon a displacement of the sleeve-shaped extension 48 in the opposite direction.

The asymmetrical clamping forces generated by the clamping arms 142 are so dimensioned that during an emergency braking operation the armature 36 may uncouple from the actuating piston 28 and come into abutment with the permanent magnet 38, while on the other hand, after the armature 36 was pulled off the permanent magnet 38, the clamping forces are sufficient to effect extensive damping of a displacement of the armature 36 counter to actuating direction relative to the actuating piston 28 and, in particular, of an impact of the armature 36 against the stop 53 formed on the actuating piston 28.

Figure 8:
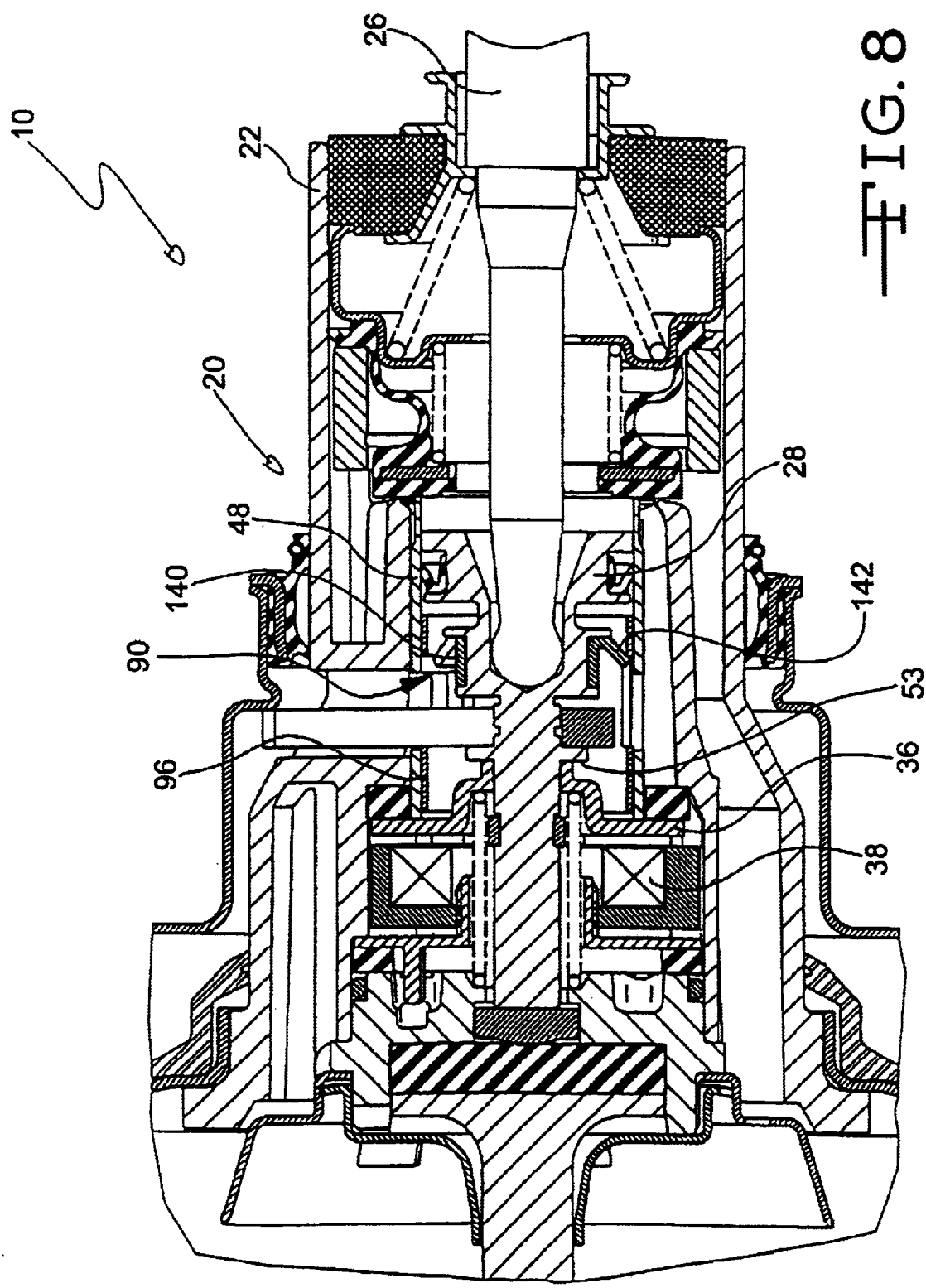

FIG. 8 shows an eighth embodiment of a vacuum brake booster 10 according to the invention. The vacuum brake booster of FIG. 8 is substantially identical in function and construction to the vacuum brake booster of the seventh embodiment. As in the seventh embodiment, the coupling device 90 takes the form of a clamping device having a plurality of clamping arms 142.

However, departing from the seventh embodiment, the clamping device 90 according to the eighth embodiment additionally comprises an opening sleeve 96 having the functionality known from the first embodiment. The opening sleeve 96 allows cancellation of the coupling of the radially outwardly biased arms 142 to the sleeve-shaped extension 48 after full release of the vehicle brake.

Figure 9:
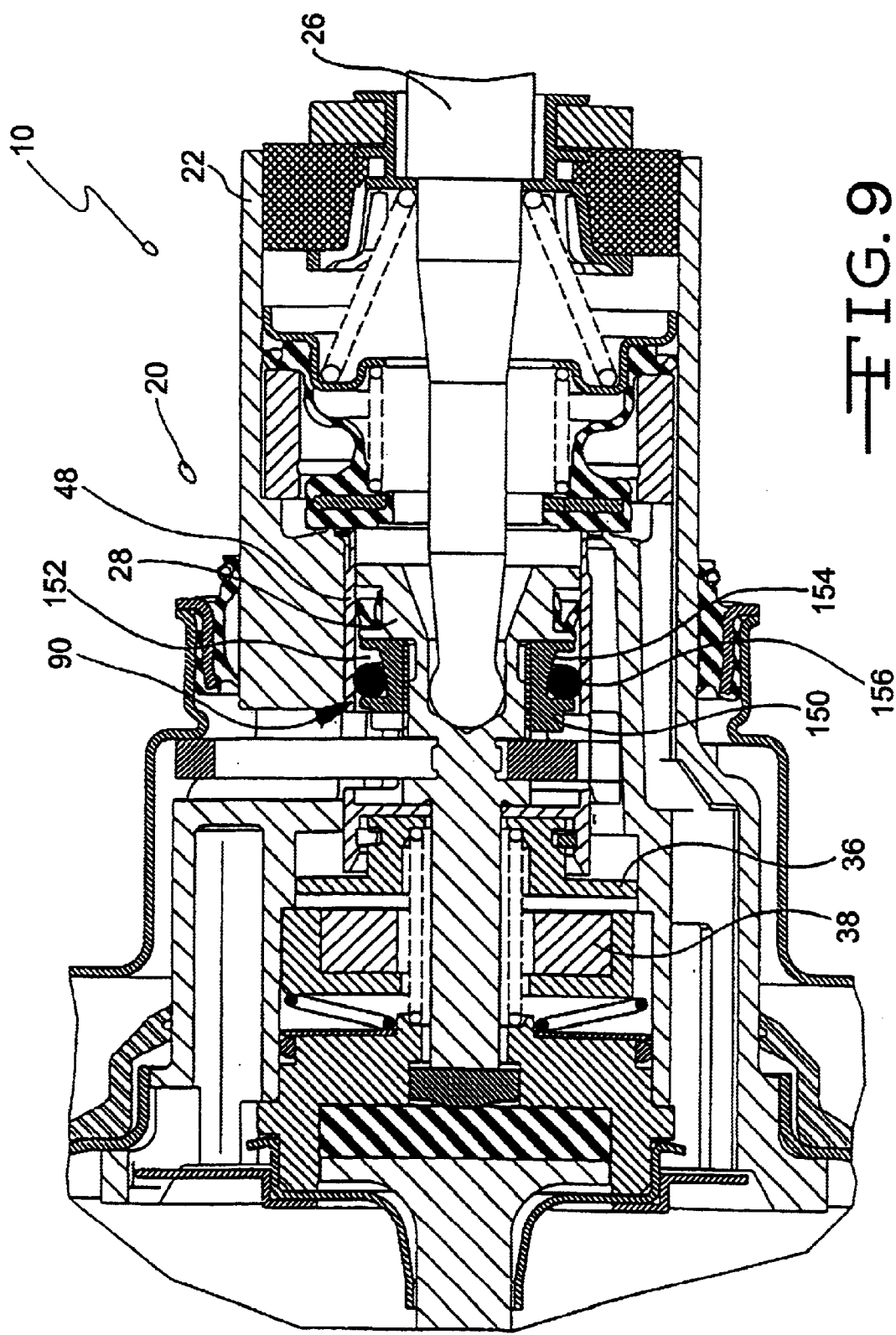

FIG. 9 shows a ninth embodiment of a vacuum brake booster 10 according to the invention. The vacuum brake booster 10 according to the ninth embodiment is substantially identical in construction and function to the vacuum brake booster of the seventh embodiment.

As in the seventh embodiment, the coupling device 90 takes the form of a clamping device. The clamping device 90 is designed in the manner of a freewheel mechanism and comprises a carrier ring 150 screwed onto the actuating piston 28. Formed in the carrier ring 150 is an annular groove 152 having a conical base. A bevel 154 is therefore defined by the conical base of the annular groove 152.

A clamping element in the form of a rolling body 156 designed as a ball cooperates with the bevel 154 to generate a radially outwardly effective clamping force as follows. Upon a relative movement between the sleeve-shaped extension 48 and the actuating piston 28, the rolling body 156 contacting the bevel 154 and the radially inner surface of the sleeve-shaped extension 48 is simultaneously moved on account of the friction between the components of the coupling device 90. Upon a movement of the sleeve-shaped extension 48 counter to actuating direction relative to the actuating piston 28, i.e. after the armature 36 was pulled off the permanent magnet 38, the rolling body 156 rolls up the bevel 154. This results in a displacement of the rolling body 156 in a radially outward direction and in a jamming of carrier ring 150, rolling body 156 and sleeve-shaped extension 48. The armature 36 is consequently, relative to the actuating piston 28, coupled counter to actuating direction to the latter.

An oppositely directed relative movement between sleeve-shaped extension 48 and actuating piston 28, on the other hand, effects an uncoupling of armature 36 and actuating piston 28 because the rolling body 156 runs down the bevel 154 and the radially effective clamping force between actuating piston 28 and sleeve-shaped extension 48 is reduced.

Figure 10:
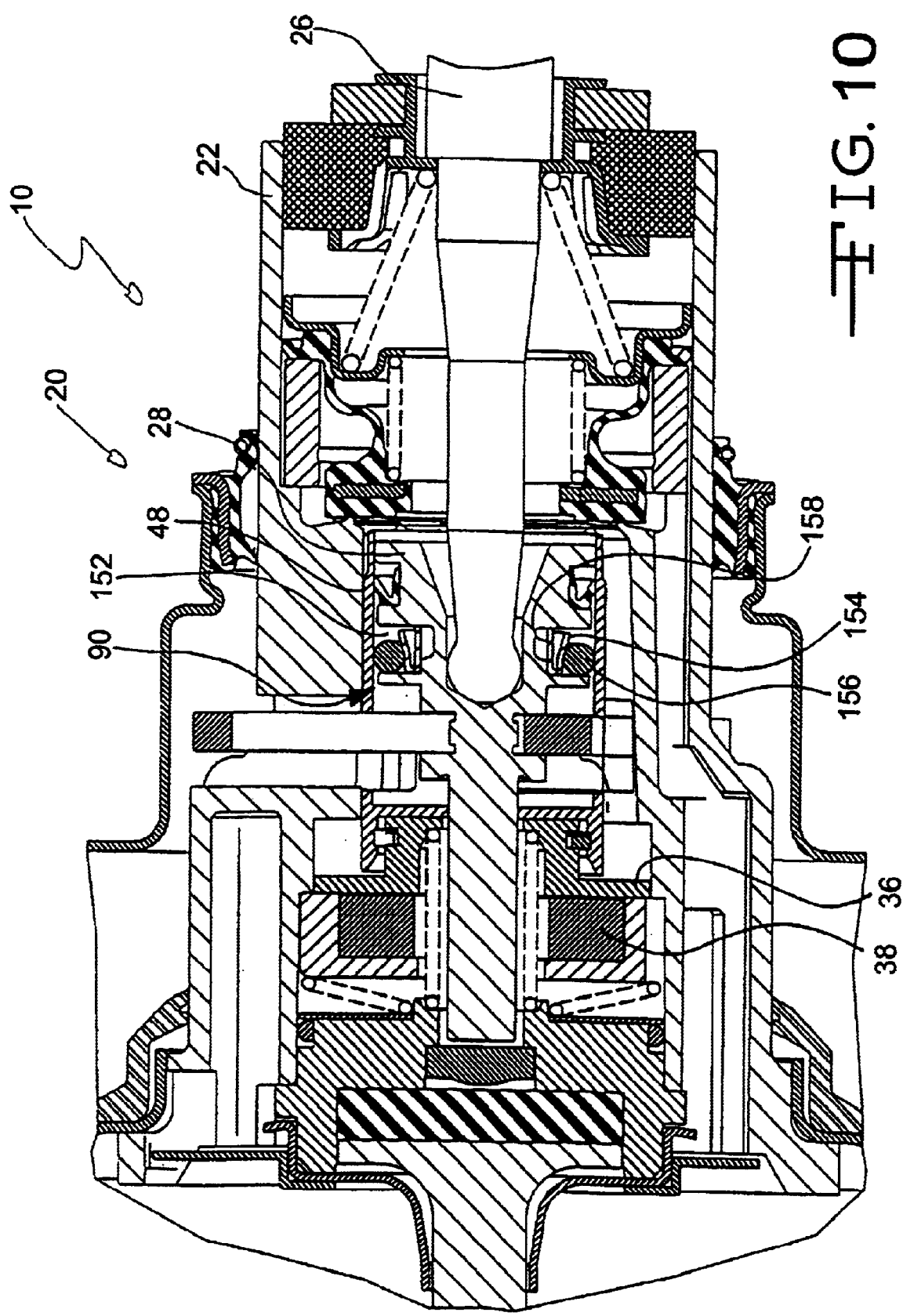
FIG. 10 a longitudinal section through the control valve of a tenth embodiment of a vacuum brake booster according to the invention in an operating position.

FIG. 10 shows a tenth embodiment of a vacuum brake booster 10 according to the invention. The vacuum brake booster 10 according to the tenth embodiment is substantially identical in function and construction to the vacuum brake booster of the ninth embodiment. Departing from the ninth embodiment, the coupling device 90 in the form of a clamping device does not however comprise a solid carrier ring but, for reasons of cost, a bent sheet-metal part 158, which is disposed inside a groove 152 of the actuating piston 28 and defines a bevel 154. The rolling body 156 corresponds to the rolling body of the ninth embodiment.

Figure 11A:
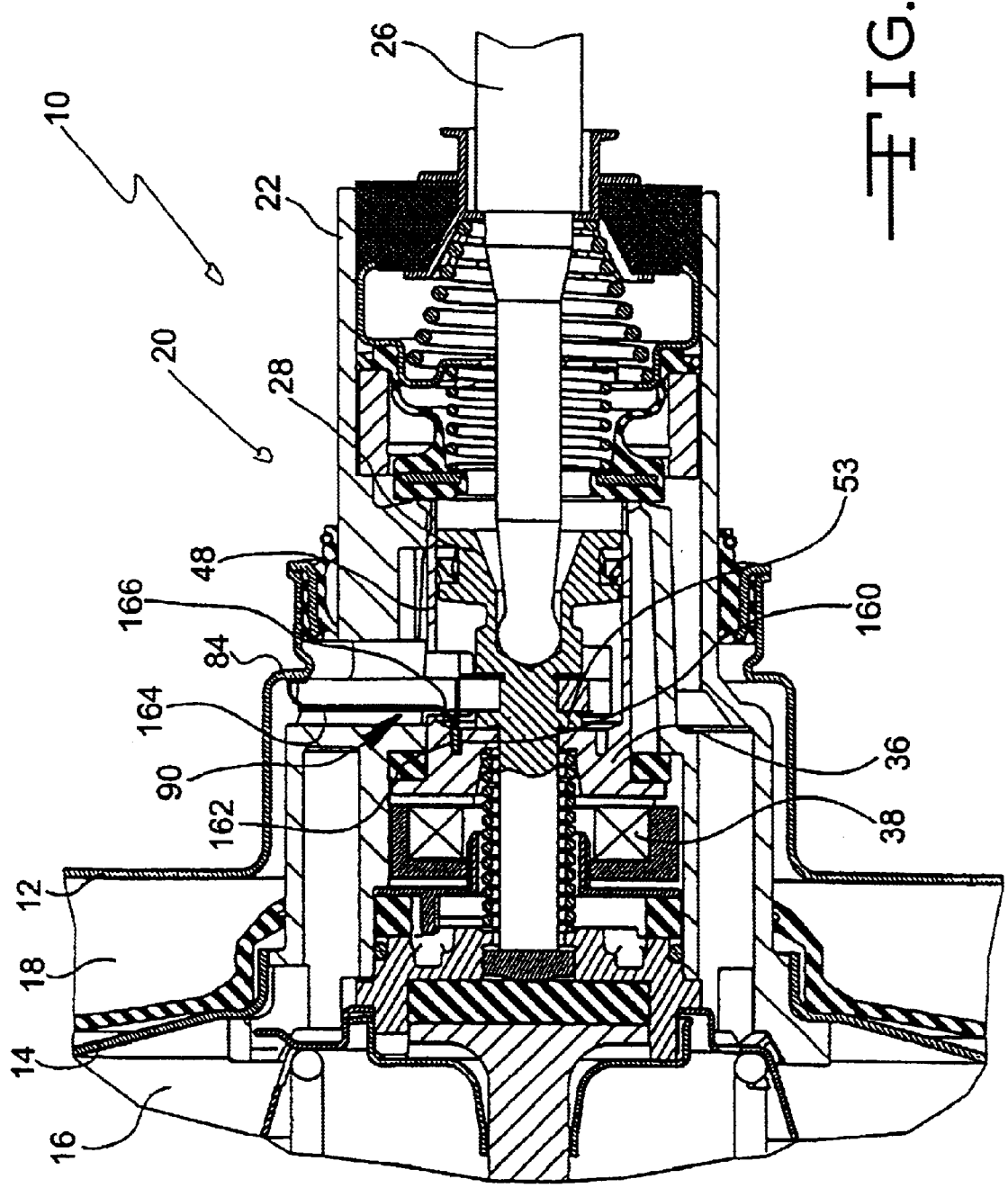
FIGS. 11a and 11b longitudinal sections through the control valve of an eleventh embodiment of a vacuum brake booster according to the invention.
Figure 11B:
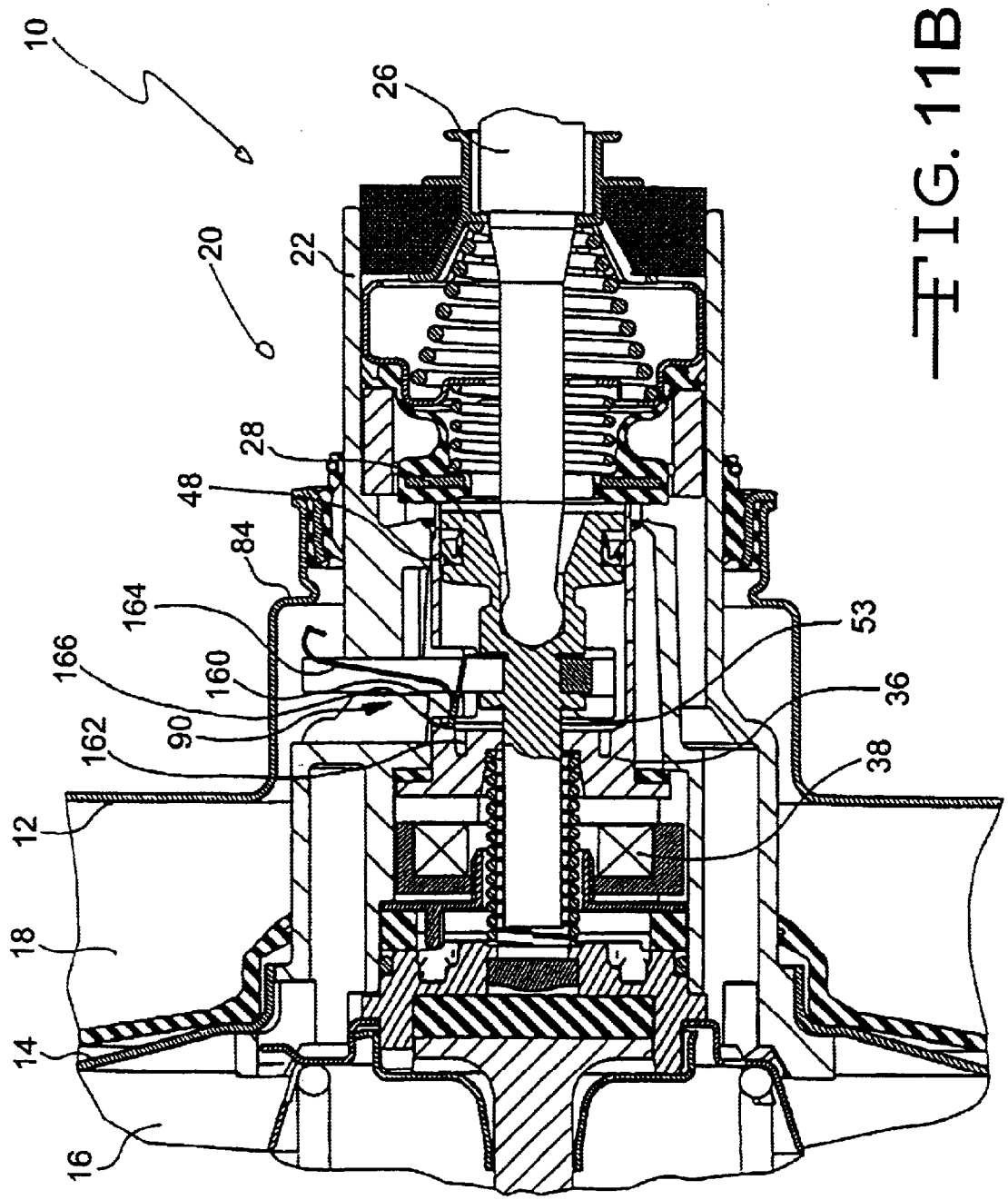

FIGS. 11a and 11b show an eleventh embodiment of a vacuum brake booster 10 according to the invention. The vacuum brake booster 10 according to the eleventh embodiment is similar in function and construction to the vacuum brake boosters of the previous embodiments. Departing from the previous embodiments, however, the coupling device 90 takes the form of a supporting device, which allows support of the armature 36 counter to actuating direction against the actuating piston 28.

The supporting device 90 comprises a supporting element 160 which, for coupling armature 36 and actuating piston 28, is capable of swivelling into a supporting position. In the initial position of the vacuum brake booster 10 shown in FIG. 11a, the supporting element 160 extends substantially in axial direction and partially engages into an opening 162 of the armature 36 extending counter to actuating direction. The supporting element 160 is rigidly coupled to the actuating piston 28 and biased radially outwards. An arm 164, which extends radially outwards and which in the initial position shown in FIG. 11a is situated in abutment with a stop 84 formed on the housing 12 of the vacuum brake booster 10 is formed integrally with the supporting element 160. In the initial position according to FIG. 11a, the supporting element 160 is latched in the opening 162 of the armature 36 without, however, performing a supporting function.

During an emergency braking operation the armature 36 is displaced in actuating direction, i.e. in FIG. 11a to the left, relative to the actuating piston 28. The armature 36 in said case moves in axial direction so far away from the actuating piston 28 that the supporting element 160 detaches from the associated opening 162 and, because of the bias, swivels radially outwards until the end of the supporting element 160 facing the vacuum chamber 16 contacts a bevel 166 formed at an end face of the armature 36 facing the input element 26.

During a return stroke of the input element 26, the armature 36 is pulled off the permanent magnet 38 and the operating position of the vacuum brake booster 10 shown in FIG. 11b arises. The supporting element 160 performs its supporting function and prevents an impact of the armature 36 against the stop 53 formed on the actuating piston 28.

It is only after full release of the brake pedal that the arm 184 moves back up against the stop 84 on the housing 12 of the vacuum brake booster 10, whereupon the supporting element 160 is swivelled back in a radially inward direction and can engage once more into the opening 162 formed in the armature 36. The supporting element 160 is then relieved of its supporting function and the initial position of the vacuum brake booster 10 shown in FIG. 11a arises.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Brake booster, having
    a vacuum chamber and a working chamber separated from one another by a movable wall,
    a control valve, which comprises a housing coupled workingly to the movable wall and which to achieve a pressure difference at the movable wall is capable of controlling the supply of atmospheric pressure or above-atmospheric pressure to the working chamber in dependence upon the displacement of an actuating piston, and
    an emergency braking aid comprising a permanent magnet and an armature, which cooperates with the permanent magnet and is resiliently biased counter to the actuating direction of the brake booster and during an emergency braking operation is drawn into abutment with the permanent magnet, with the result that the control valve is held open for the supply of atmospheric pressure to the working chamber, wherein a coupling device is provided for detachably coupling the armature to the actuating piston.
2. Vacuum brake booster according to claim 1, wherein the coupling device is a detent device.
3. Vacuum brake booster according to claim 2, wherein the detent device comprises a first detent element and a complementary second detent element, which cooperate in order to couple the armature to the actuating piston.
4. Vacuum brake booster according to claim 3, wherein the first detent element is movable in a radial direction.
5. Vacuum brake booster according to claim 4, wherein the first detent element is biased in a radial direction.
6. Vacuum brake booster according to claim 3, wherein the first detent element takes the form of one of a snap-action hook and or a ring.
7. Vacuum brake booster according to claim 6, wherein the snap-action hook is disposed in the region of a substantially axially extending swivelling arm.
8. Vacuum brake booster according to claim 7, wherein the snap-action hook is formed by bevelling one or several regions of the swivelling arm.
9. Vacuum brake booster according to claim 7, wherein the swivelling arm is rigidly coupled to a further arm which allows the swivelling arm to be deflected.
10. Vacuum brake booster according to claim 7, wherein the swivelling arm is attached to the actuating piston so that it can be pivoted.
11. Vacuum brake booster according to claim 3, wherein the second detent element takes the form of one of an opening, indentation and bevel.
12. Vacuum brake booster according to claim 6, wherein the snap-action hook is provided with an inclined surface cooperating with a boundary of the openings.
13. Vacuum brake booster according to claim 1, wherein the coupling device is a clamping device.
14. Vacuum brake booster according to claim 13, wherein the clamping device comprises a clamping element generating a clamping force in radial direction.
15. Vacuum brake booster according to claim 14, wherein the clamping element has, in relation to an axial relative movement in and counter to actuating direction between the armature and the actuating piston, asymmetrical clamping properties.
16. Vacuum brake booster according to claim 14, wherein the clamping device comprises a bevel, with which the clamping element cooperates.
17. Vacuum brake booster according to claim 14, wherein the clamping element takes the form of a rolling body.
18. Vacuum brake booster according to claim 14, wherein the clamping element is a clamping arm extending obliquely relative to the longitudinal axis of the vacuum brake booster.
19. Vacuum brake booster according to claim 1, wherein the coupling device comprises an axially movable opening sleeve for cancelling the coupling between armature and actuating piston.
20. Vacuum brake booster according to claim 1, wherein the coupling device is a supporting device.
21. Vacuum brake booster according to claim 20, wherein the supporting device comprises a supporting element, which for coupling armature and actuating piston is capable of swivelling into a supporting position.
22. Vacuum brake booster according to claim 1, wherein a stop is provided on the actuating piston which stop is disposed in actuating direction upstream of the armature and cooperates counter to actuating direction with the armature.
23. Vacuum brake booster according to claim 1, wherein a bar is provided, which extends substantially at right angles to and is coupled with the actuating piston.

* * * * *